US008062014B2

(12) United States Patent
Gubanich et al.

(10) Patent No.: US 8,062,014 B2
(45) Date of Patent: Nov. 22, 2011

(54) METHOD AND APPARATUS USING A SPLIT CASE DIE TO PRESS A PART AND THE PART PRODUCED THEREFROM

(75) Inventors: Richard J. Gubanich, Delmont, PA (US); Edward M. Dinco, Latrobe, PA (US); Kent P. Mizgalski, Stahlstown, PA (US); Thomas R. Weisel, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 967 days.

(21) Appl. No.: 11/945,647

(22) Filed: Nov. 27, 2007

(65) Prior Publication Data

US 2009/0136776 A1 May 28, 2009

(51) Int. Cl.
*B29C 43/04* (2006.01)

(52) U.S. Cl. ....... 425/78; 425/330; 425/348 S; 425/441; 100/232

(58) Field of Classification Search .................... 425/78, 425/330, 441, 348 S, DIG. 58, 352, 356; 100/232
See application file for complete search history.

(56) References Cited

U.S. PATENT DOCUMENTS

| | | | | |
|---|---|---|---|---|
| 2,751,293 | A | 6/1956 | Haller | |
| 2,791,804 | A | 5/1957 | Talmage | |
| 2,800,684 | A | 7/1957 | Luthman | |
| 3,020,589 | A | 2/1962 | Maritano | |
| 3,346,914 | A | 10/1967 | Sandstrom et al. | |
| 3,555,607 | A | 1/1971 | Epain et al. | |
| 3,758,245 | A | 9/1973 | Hermes | |
| 3,947,541 | A * | 3/1976 | Barnes | 425/77 |
| 3,972,662 | A | 8/1976 | Bird | |
| 4,284,124 | A * | 8/1981 | Komatsu et al. | 425/330 |
| 4,439,129 | A | 3/1984 | Long et al. | |
| 4,655,984 | A | 4/1987 | Hinton et al. | |
| 5,032,050 | A | 7/1991 | Niebauer et al. | |
| 5,039,292 | A | 8/1991 | Tanigawa et al. | |
| 5,043,123 | A | 8/1991 | Gormanns et al. | |
| 5,364,253 | A | 11/1994 | Kojima et al. | |
| 5,403,373 | A | 4/1995 | Kitagawa et al. | |
| 5,503,795 | A | 4/1996 | Hubbard | |
| 5,701,574 | A | 12/1997 | Derflinger et al. | |
| 5,710,969 | A | 1/1998 | Newmann | |
| 5,725,816 | A | 3/1998 | Sagawa et al. | |
| 5,772,748 | A | 6/1998 | Hubbard | |

(Continued)

FOREIGN PATENT DOCUMENTS

DE 43 36 744 5/1995

(Continued)

OTHER PUBLICATIONS

Dorst Technologies, TPA HS Pressing forces from of 150 to 1.2000 kN, May 2006.

(Continued)

*Primary Examiner* — Richard Crispino
*Assistant Examiner* — Thukhanh Nguyen
(74) *Attorney, Agent, or Firm* — Larry R. Meenan

(57) ABSTRACT

A split case die is used to press powder, wherein the die parts are moveable in a direction non-parallel to the direction of the pressing axis. The part produced by such a split case die has an external surface with parting line marks oriented in a direction non-perpendicular to the pressing axis.

22 Claims, 19 Drawing Sheets

U.S. PATENT DOCUMENTS

| | | | | |
|---|---|---|---|---|
| 6,010,283 | A | 1/2000 | Henrich et al. | |
| 6,080,358 | A | 6/2000 | Oba et al. | |
| 6,113,378 | A | 9/2000 | Tsubol et al. | |
| 6,116,890 | A | 9/2000 | Sors | |
| 6,318,986 | B1 * | 11/2001 | Hinzmann et al. | 425/352 |
| 6,645,426 | B1 | 11/2003 | Yoshihara et al. | |
| 6,860,172 | B2 | 3/2005 | Hecht | |
| 6,986,866 | B2 | 1/2006 | Gubanich et al. | |
| 7,829,015 | B2 * | 11/2010 | Kuplen et al. | 425/78 |
| 2002/0011690 | A1 | 1/2002 | Tojo et al. | |
| 2004/0035269 | A1 | 2/2004 | Hecht | |
| 2004/0086415 | A1 | 5/2004 | Gubanich | |
| 2005/0269729 | A1 | 12/2005 | Holthausen et al. | |
| 2006/0165828 | A1 | 7/2006 | Smilovici et al. | |
| 2008/0020082 | A1 | 1/2008 | Plucinski et al. | |
| 2008/0196604 | A1 | 8/2008 | Menzel et al. | |

FOREIGN PATENT DOCUMENTS

| | | | |
|---|---|---|---|
| DE | 195 08 952 | A1 | 9/1996 |
| EP | 0 718 473 | | 6/1996 |
| EP | 0718473 | | 6/1996 |
| EP | 1 852 247 | | 11/2007 |
| EP | 1 952 975 | | 8/2008 |
| EP | 2 098 317 | | 9/2009 |
| EP | 2 103 423 | A1 | 9/2009 |
| FR | 2.095.120 | | 2/1972 |
| FR | 2863187 | | 12/2003 |
| GB | 1 398 611 | | 6/1975 |
| GB | 2271526 | A | 4/1994 |
| GB | 2 329 863 | | 4/1999 |
| JP | 55-088945 | | 7/1980 |
| JP | 359197503 | A | 11/1984 |
| JP | 63-036998 | | 2/1988 |
| JP | 63-168296 | | 7/1988 |
| JP | 7-040096 | | 2/1995 |
| JP | 7-124792 | | 5/1995 |
| JP | 10-071497 | | 3/1998 |
| JP | 10-118796 | | 5/1998 |
| JP | 10-146695 | | 6/1998 |
| JP | 10296499 | | 11/1998 |
| JP | 11-300497 | | 11/1999 |
| JP | 2000-135598 | | 5/2000 |
| JP | 2000-237899 | | 6/2000 |
| JP | 2001256899 | | 9/2001 |
| JP | 2003-193106 | | 7/2003 |
| JP | 2005-177836 | | 7/2005 |
| JP | 2005177835 | | 7/2005 |
| WO | 9408743 | | 4/1994 |
| WO | WO 01/74519 | | 10/2001 |
| WO | WO 2006/080002 | | 8/2006 |
| WO | 2007/019832 | A2 | 2/2007 |
| WO | 2009/115444 | A1 | 9/2009 |

OTHER PUBLICATIONS

Dorst Technologies, New Ways—New Quality, side Compacting—a new Dimension, May 2006.

Jan Entwicklung brochure (2 pages), Dec. 2006.

* cited by examiner

TOP VIEWS

METHOD AND APPARATUS USING A SPLIT CASE DIE TO PRESS A PART AND THE PART PRODUCED THEREFROM

BACKGROUND OF THE INVENTION

1. Field of the Invention

The invention is directed to a metallurgical process for the consolidation of powder, wherein the process involves the utilization of a split case die. The subject invention is also directed to a part produced from such a process.

2. Description of Related Art

Fabrication of cutting inserts from sinterable powder, i.e. metallurgical cermets or ceramic powders, involves compaction of the sinterable powder with or without a fugitive binder into a pre-sintered green part. Subsequent sintering of the green part produces a finished part which may be a cutting tool. Compaction takes place under high pressure obtained through large opposing forces generated by top and bottom rams urged into a die cavity formed in a die containing the sinterable powder.

U.S. Pat. No. 6,986,866 is directed to a method and apparatus for cross-hole pressing to produce cutting inserts, whereby a solid unified die having a die cavity within is utilized to produce a green part. The green part is ejected through the unified die cavity and, as a result, the shape of the green part is limited to a shape able to "slide" through and out of the die cavity.

United States Patent Application Publication No. US 2006/0165828 is directed to a method and apparatus for manufacturing a cutting insert, whereby a split case die is separable in a direction parallel to the pressing axis to produce a green part that would not be able to freely pass through the die cavity on either side of the green part. However, utilizing such an arrangement, the features on the side of the green part must be configured such that the die parts may slide over them to release the green part. Not only does this requirement dictate limitations on the shape of the green part but, furthermore, the die parts sliding over the green part introduce friction against the part that might damage the part.

A process and apparatus is needed for use in a pressing operation, whereby the shape of the green part is not subjected to release from the die by sliding through the die or by having die parts slide over the part.

SUMMARY OF THE INVENTION

In one embodiment, a die for use with a uni-axial press for forming a compressed part from powder has top and bottom outer surfaces and a cavity extending therethrough along a pressing axis. The cavity is made up of a die chamber having walls with ends defining the shape of the part in the compressed state and a pressing bore extending from each end of the die chamber. The die is comprised of at least two separable die parts with parting surfaces and, a substantial portion of the parting surfaces is non-perpendicular to the pressing axis.

In another embodiment, a die for use with a uni-axial press for forming a compressed part from powder has top and bottom outer surfaces and a cavity extending therethrough along a pressing axis. The cavity is made up of a die chamber having walls with ends defining the shape of the part in the compressed state. The die is comprised of at least two separable die parts, wherein each die part is adapted to move only in a direction other than parallel to the pressing axis. Each die part has a chamber segment which, together with the other chamber segment(s), define the die chamber and parting line surfaces within the chamber segment which, in the assembled die, contact adjacent parting line surfaces within the chamber segment of the one or more other die parts to surround and define the die chamber. The chamber wall has at least one portion that forms a positive angle with the pressing axis and at least one other portion that forms a negative angle with the pressing axis.

In yet another embodiment, a die for use with a uni-axial press for forming a compressed part from powder has a pressing bore extending therethrough along a pressing axis. The die is comprised of at least two separable die parts. Each die part has: a) a chamber segment which together with the other chamber segment(s) define a die chamber having a chamber wall; b) a pressing bore segment which together with the other pressing bore segment(s) define the pressing bore extending from opposing ends of the chamber through the die outer surfaces; and c) parting line surfaces adjacent to the chamber segment which, in the assembled die, contact parting line surfaces of other chamber surface(s) to assemble the die. The chamber wall has at least one of either a concave or convex surface along a plane non-perpendicular with the pressing axis and, wherein at least one point along the surface between the ends of the surface has a tangent parallel to the pressing axis.

In still another embodiment, a uni-axial press for forming a part from compressed powder is comprised of a) a die having at least two separable die parts that in the assembled state define a die chamber therein and a pressing bore along a pressing axis extending from opposing ends of the chamber through the die outer surface and b) at least one top ram and at least one bottom ram movable relative to one another along the pressing axis proximate to the ends of the chamber. The at least two separable die parts each have a chamber part which together define the die chamber and, wherein the die parts are movable between an assembled state and a separated state in directions that are non-parallel to the pressing axis.

In yet another embodiment, a method for making a part from powder using a uni-axial press comprises the steps of a) with a die having at least two separable die parts that, in the assembled state, define a die cavity with a die chamber therein and a pressing bore along a pressing axis extending from opposing sides of the chamber through the die outer surface, positioning the die parts together in the assembled state and b) filling the die and the pressing bores with powder. Furthermore, using at least one top ram and at least one bottom ram movable relative to one another along the pressing axis proximate to the chamber; compressing the powder to within the region of the chamber is compressed with each separable die part having a chamber part which together define the die chamber, spacing apart the top and bottom rams from each other and separating the die parts in a direction non-parallel to the pressing axis to release the part.

In yet another embodiment, an article is formed using a uni-axial press motion having a die with a cavity extending therethrough along a pressing axis, wherein the cavity is made up of a chamber and a pressing bore on each side of the chamber with a top ram and a bottom ram independently movable along the pressing axis within the cavity. The article is formed by the steps of a) with a die having at least two separable die parts that in the assembled state define a die chamber therein and a pressing bore along a pressing axis extending from opposing sides of the chamber through the die outer surface, positioning the die parts together in the assembled state; b) filling the die and the pressing bores with powder; c) using at least one top ram and at least one bottom ram movable relative to one another along the pressing axis proximate to the chamber; compressing the powder to within the region of the chamber; and d) with each separable die part having a chamber part which together define the die chamber, spacing apart the top and bottom rams from each other and separating the die parts in a direction non-parallel to the pressing axis to release the part.

In yet another embodiment, an article is comprised of compacted powder, wherein the article has a body with a primary axis extending therethrough, wherein the body is formed through a pressing operation and, wherein the external surface of the body has parting lines in a direction non-perpendicular to the pressing axis.

DETAILED DESCRIPTION OF THE INVENTION

Figure 1:
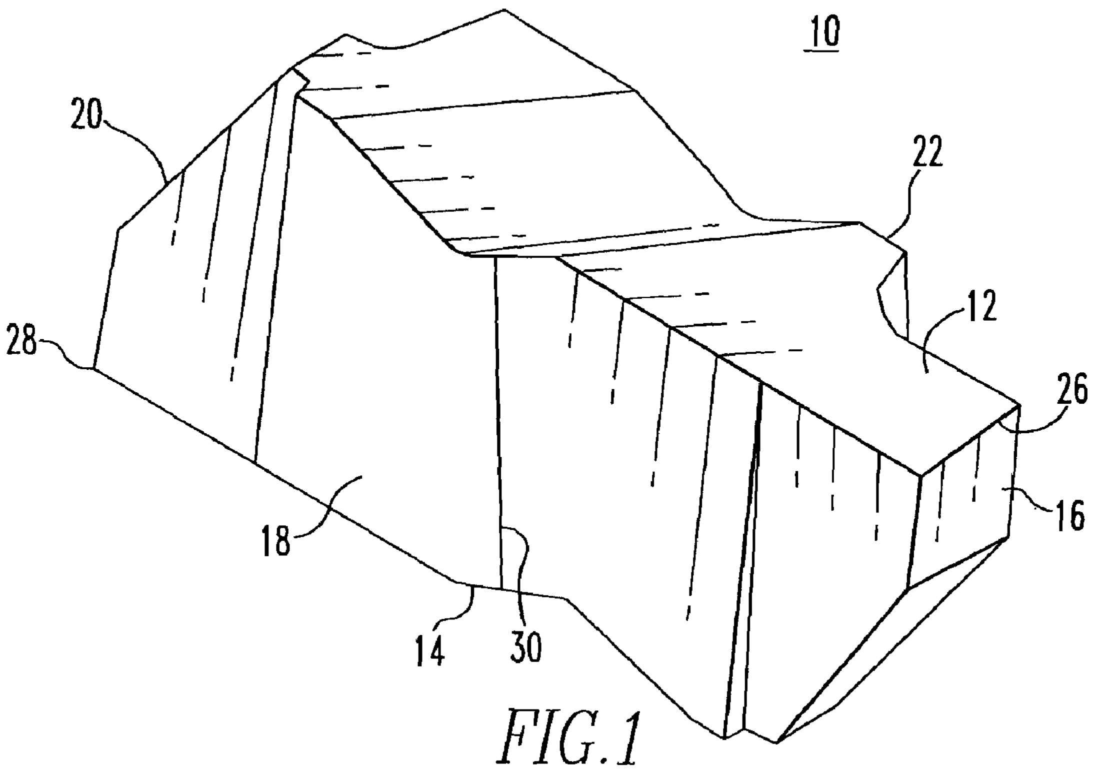
FIG. 1 is a perspective view of a part representing a cutting insert for use in metalworking operations.
Figure 2:
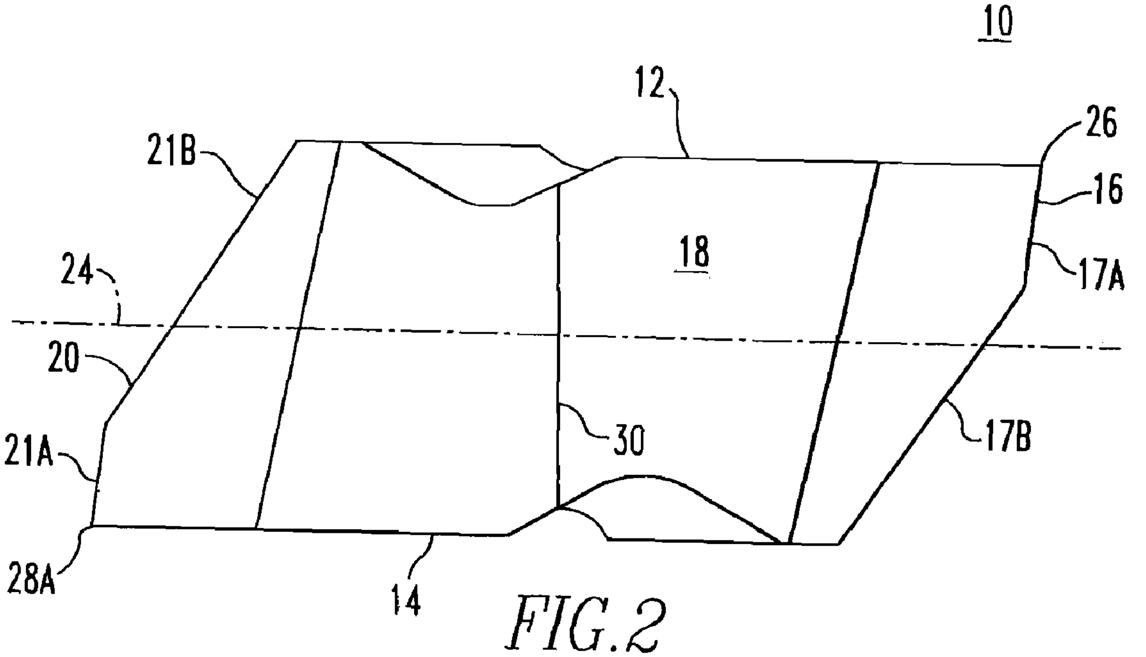
FIG. 2 illustrates a side view of the part illustrated in FIG. 1.
Figure 3:
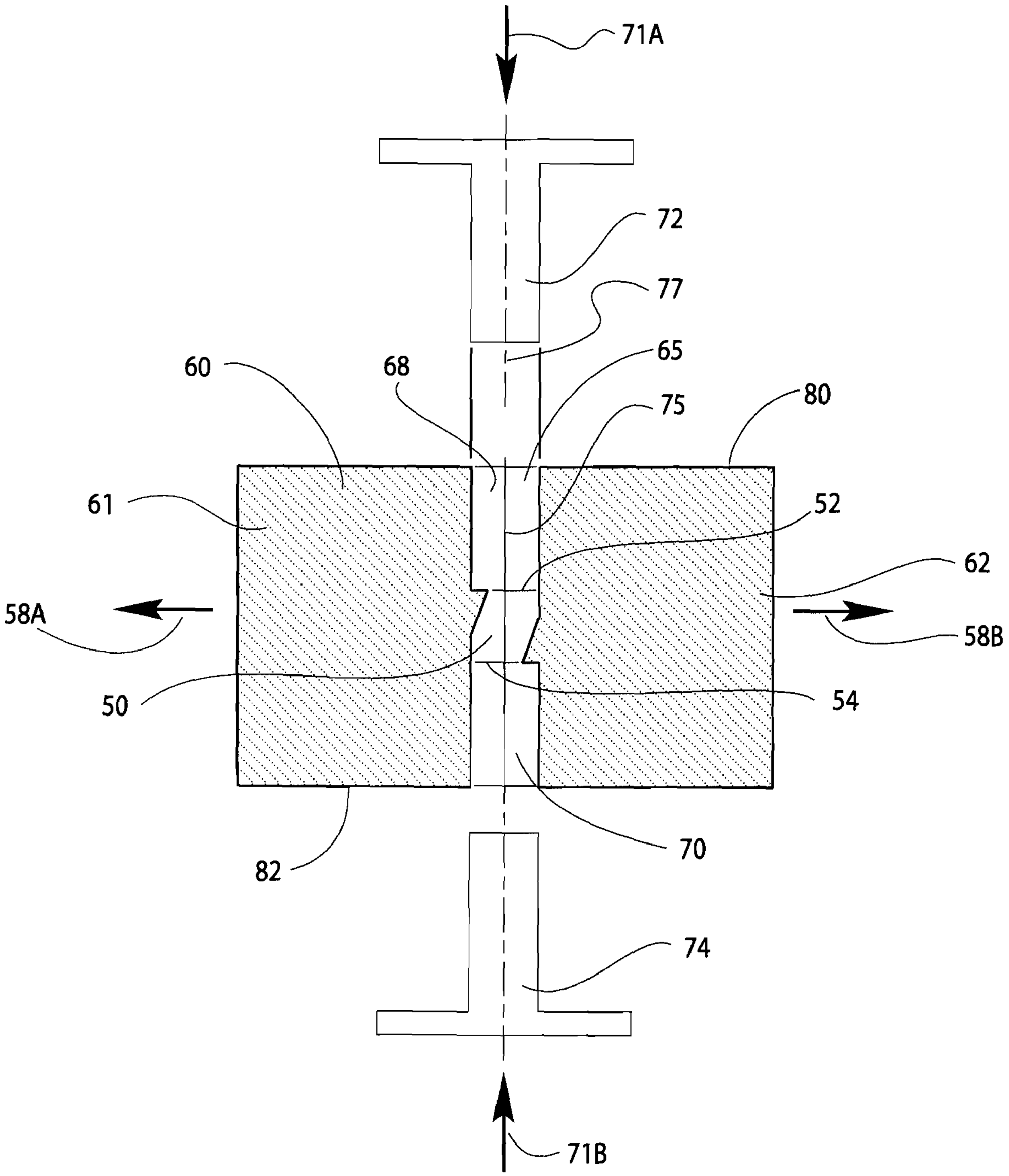
FIG. 3 is a schematic of a split case die with top and bottom rams which act in concert with the split case die.

FIGS. 1 and 2 illustrate a green part 10 that, after sintering, will be a cutting insert. However, this green part 10 will be discussed as it applies to a split case die. FIG. 3 illustrates an arrangement showing a die 60 having the die chamber 50 with a shape generally similar to that of the side view of green part 10 illustrated in FIG. 2. In particular, the green part 10 has a top surface 12 and a bottom surface 14 with side walls 16, 18, 20 and 22 therebetween. Sidewall 16 has a generally vertical segment 17A extending from the top surface 12 and an angled segment 17B extending to the bottom surface 14. Additionally, sidewall 20 has a generally vertical segment 21A extending from the bottom surface 14 and an angled segment 21B extending to the top surface 12. The green part 10 is symmetric about a centerline 24. It should be noted that the angled segments 17B, 21B of the side walls 16, 20 both overlap the centerline 24. The green part 10 has an edge 26 and a diametrically opposing edge 28 that, after sintering, will, be utilized as cutting edges.

Attention will now be directed to FIG. 3 showing the die 60 for use with a uni-axial press for forming a compressed part 10 (FIG. 2) from powder such as metallurgical powder. As a brief overview, the die 60 has a die cavity 65 made up of a die chamber 50 in which the compressed green part 10 (FIG. 2) is formed. A first pressing bore 68 is in the die cavity 65 on one side of the die chamber 50, while a second pressing bore 70 is in the die cavity 65 on the opposite side of the die chamber 50. A top ram 72 is moveable within the first pressing bore 68 along arrow 71A while a bottom ram 74 is moveable within the second pressing bore 70 along arrow 71B. Each ram is moveable to a compressed position to the edge 52, 54 of the die chamber 50. With the top ram 72 and the bottom ram 74 extended into the respective pressing bores 68, 70 the die chamber 50 has a configuration essentially identical to the configuration of the green part 10.

Figure 7:
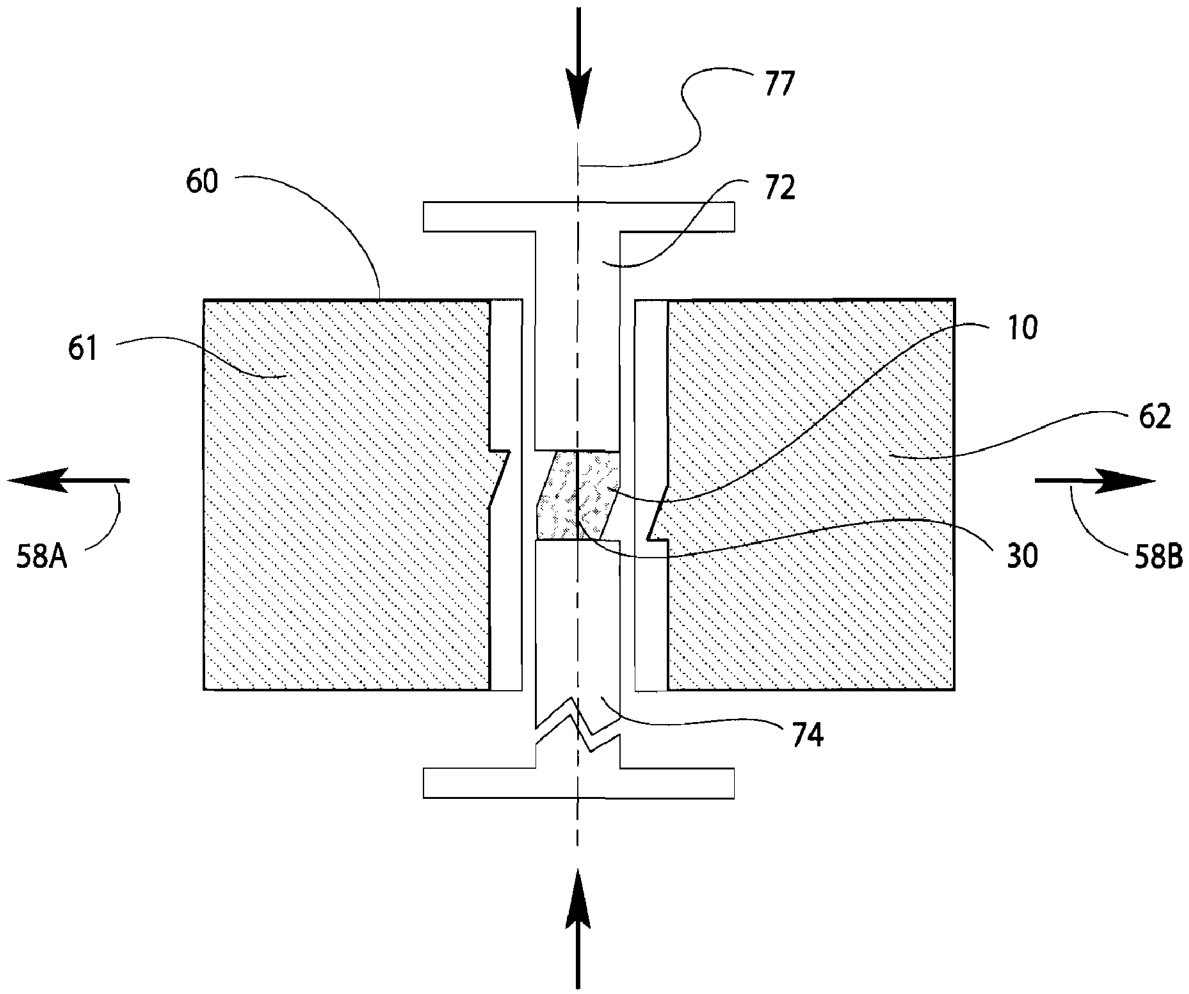
FIG. 7 is a schematic of the parts illustrated in FIG. 3, but with the die parts moving away to illustrate separation.

It should be noted, however, with respect to FIG. 3, that once the green part 10 is formed within the die chamber 50, it is essentially captured within the die chamber 50 and cannot be removed intact without separating the die 60, even with the top ram 72 and the bottom ram 74 fully withdrawn. However, in accordance with the subject invention, the die 60 is a split case die such that, for example, die part 61 is separate and distinct from die part 62. The die parts 61, 62 are separated for purposes of this explanation along a parting line 75 aligned with the pressing axis 77. As a result, as illustrated in FIG. 7, the die part 61 may be separated from the die part 62 along, for example, the direction of arrows 58A, 58B, to provide sufficient clearance for the green part 10 to be easily removed from the die 60.

While parting line 75 is illustrated as a straight line, the line may also have a non-straight configuration, depending upon the shape of the desired part and the desire to separate the die parts without interference.

FIGS. 3-8 will now be discussed with attention directed to the method for making the green part 10 from powder using a uni-axial press.

Figure 4:
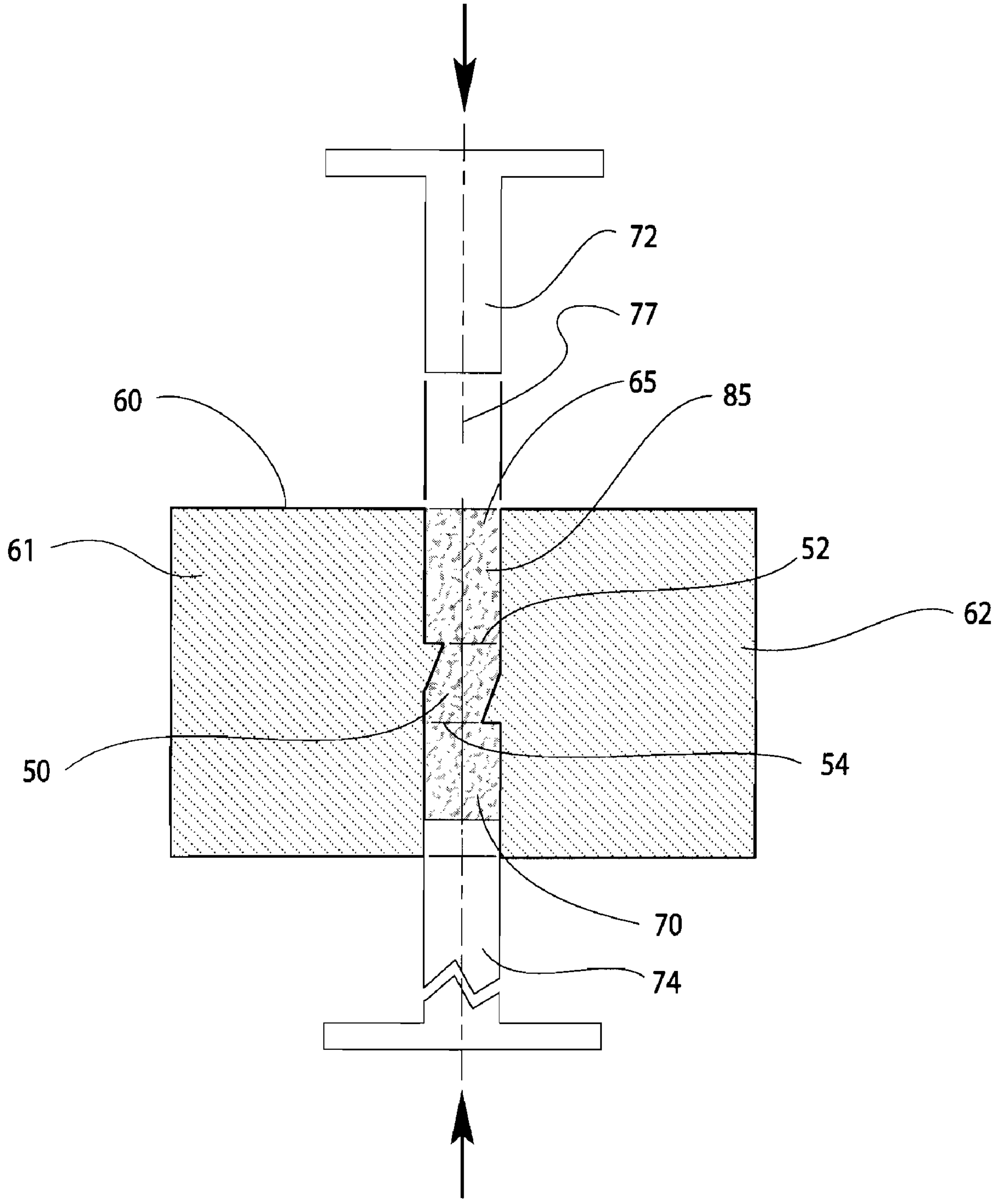
FIG. 4 is a schematic of the same elements in FIG. 3 but repositioned to show a "fill" configuration.

The die 60 has at least two separable die parts 61, 62 that, in the assembled state (FIG. 3), define the die cavity 65 with the die chamber 50 therein. The first pressing bore 68 extends along the pressing axis 77 from the die chamber 50 through the die upper outer surface 80. The second pressing bore 70 extends along the pressing axis 77 from the die chamber 50 through the die lower outer surface 82. FIG. 3 illustrates the die part 61, 62 together in the assembled state. As illustrated in FIG. 4, the bottom ram 74 is moved upwardly to occupy a portion of the second pressing bore 70. Thereafter, the die cavity 65 is filled with the appropriate amount of powder 85, such that, when the top ram 72 and the bottom ram 74 are brought toward one another to the edges 52, 54 of the die chamber 50, powder 85 is compressed into a configuration of the final green part 10 (FIG. 1).

It should be appreciated that the top ram 72 and the bottom ram 74 are moveable relative to one another along the pressing axis 77 proximate to the die chamber 50 and compress the powder 85 to the volume of the die chamber 50. It is possible to retain the bottom ram 74 in a fixed position and, to move the die 60 and the top ram 72 downwardly to produce the fully compressed green part 10.

Figure 5:
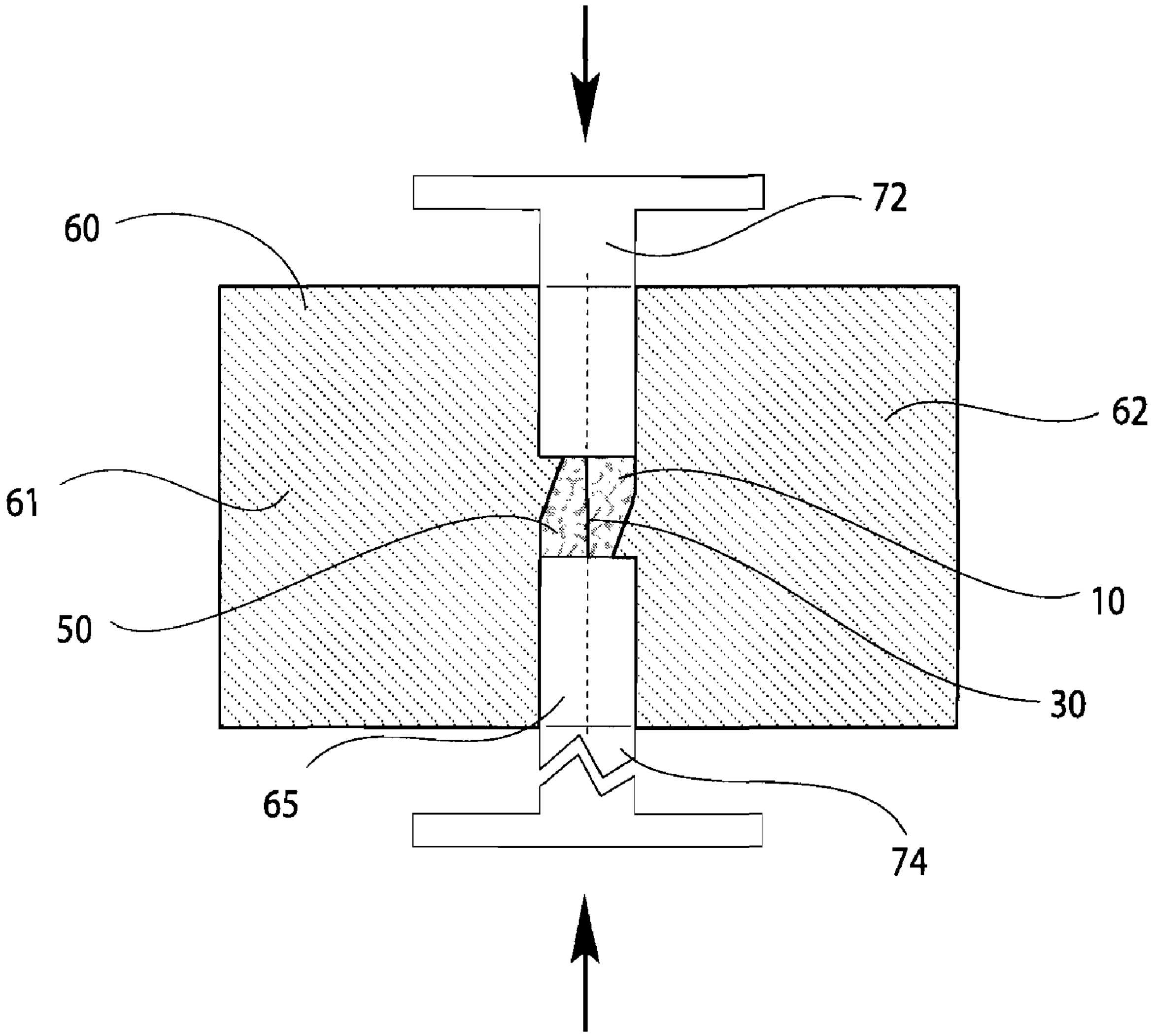
FIG. 5 is a schematic with the same parts as FIG. 3, but in a configuration illustrating compression of a part.

FIG. 5 illustrates the top ram 72 and the bottom ram 74 in their fully compressed position, thereby defining the green part 10.

Figure 6:
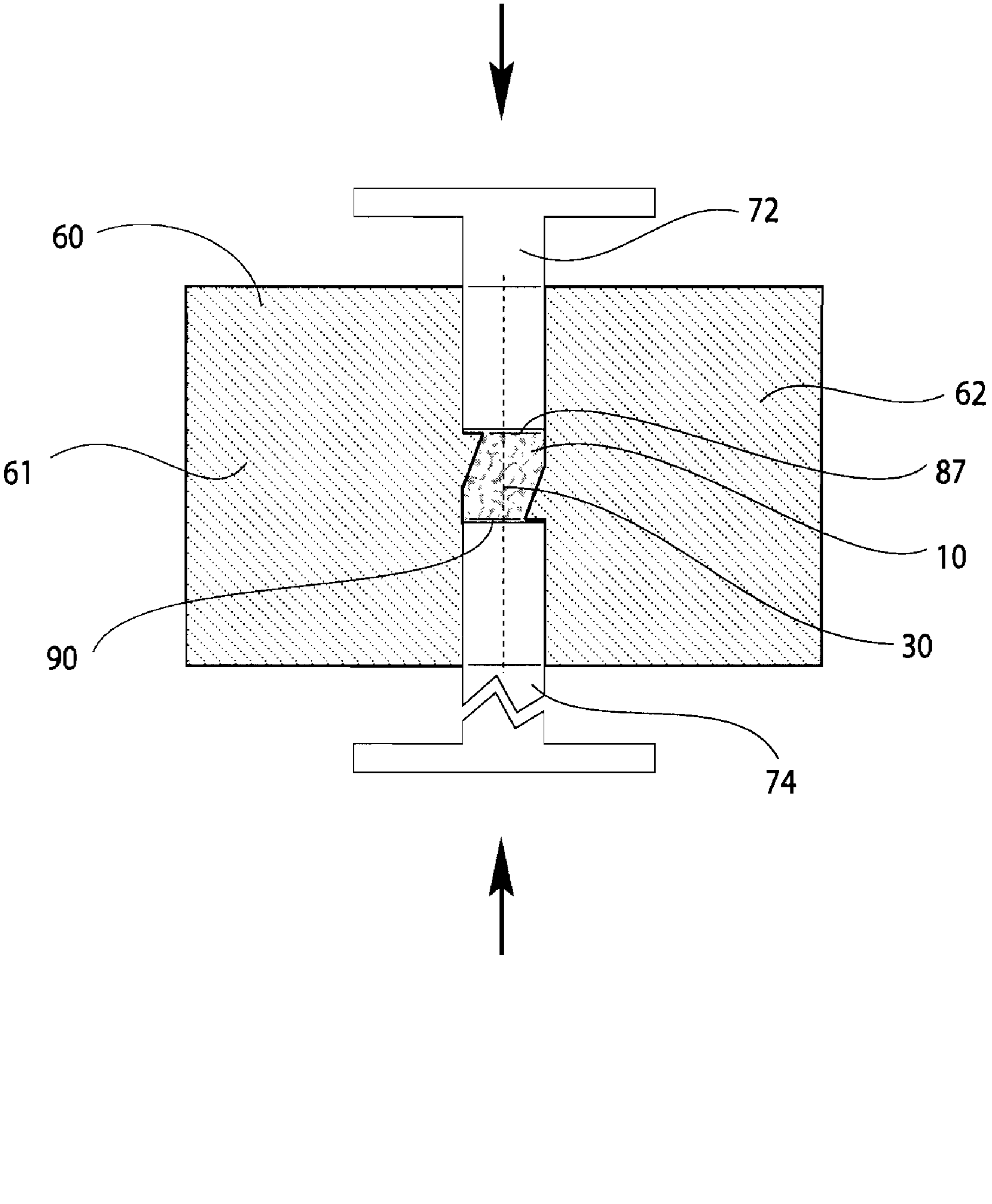
FIG. 6 is a schematic with parts similar to those in FIG. 3, but illustrating the top and bottom rams slightly removed from the part to provide for decompression.
Figure 8:
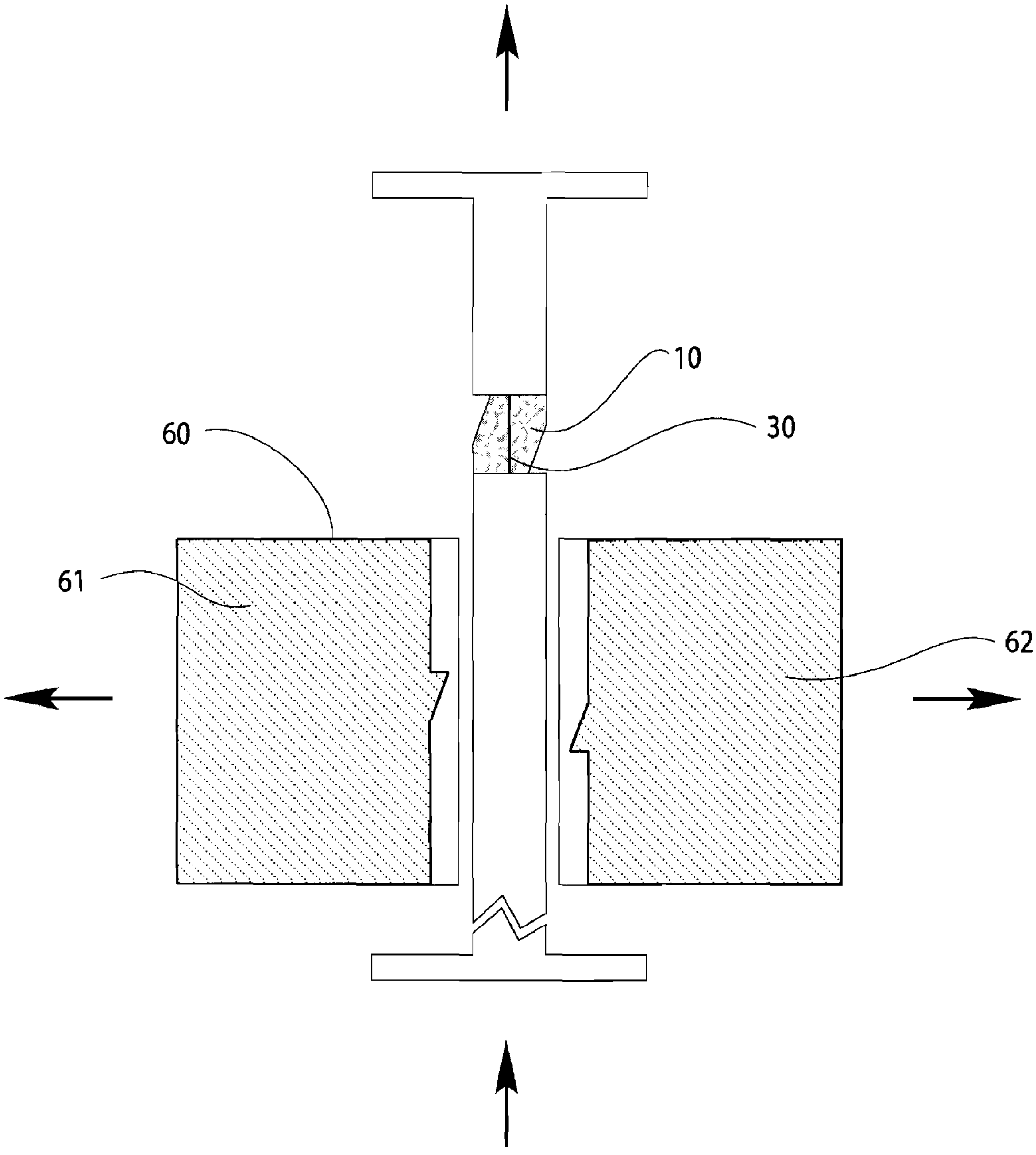
FIG. 8 is a schematic of the die parts illustrated in FIG. 3, but configured to eject the compressed part.

Although after the green part 10 is sintered, the resulting part is essentially rigid, prior to sintering the green part 10 the compressed powder does have some resiliency. As a result, when the steps for removing the part 10 from the die 60 are initiated, the highly compressed green part 10 resiliently expands to a neutral state. If this decompression were permitted to occur in an unencumbered fashion, the green part 10 might become stressed and cracked. As a result, the top ram 72 and the bottom ram 74, after the green part 10 is fully compressed (FIG. 5), are moved slightly apart, as illustrated in FIG. 6, to permit the green part 10 to decompress but only to a predetermined amount, as illustrated by the top gap 87 associated with the top ram 72 and the bottom gap 90 associated with the bottom ram 74. These gaps 87, 90 provide partial volume relief to the part 10, thereby permitting controlled decompression. The green part 10 expands to generally fill these newly generated gaps 87, 90. Thereafter, as illustrated in FIG. 7, the die parts 61, 62 are separated laterally from one another to provide sufficient clearance for the green part 10 to be removed from what was the die cavity 65. It should be noted that, as illustrated in FIG. 7, the die part 61 moves relative to the die part 62 in a direction non-parallel to the pressing axis 77 to release the green part 10. As illustrated in FIG. 8, the die parts 61, 62 displaced a sufficient amount relative to the part 10 such that the green part 10 is free from the die 60 and may be thereafter removed.

As illustrated in FIG. 5, the die parts 61, 62 are assembled together, to create a die chamber 50 which captures the green part 10 so that it is immovable within the die cavity 65.

Figure 9:
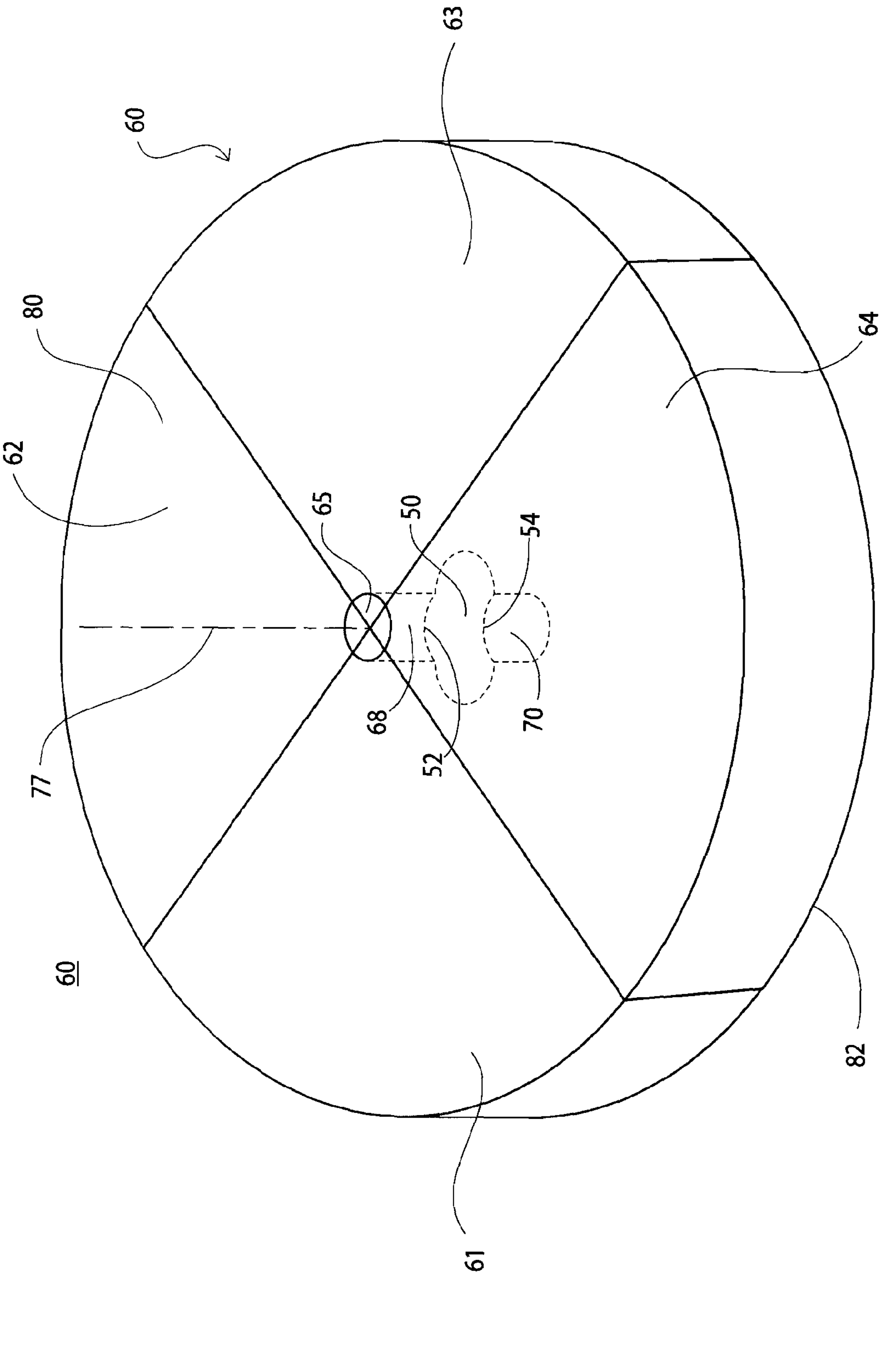
FIGS. 9 and 10 illustrate one split case die in the assembled state and in the separated state, respectively, in accordance with the subject invention.
Figure 10:
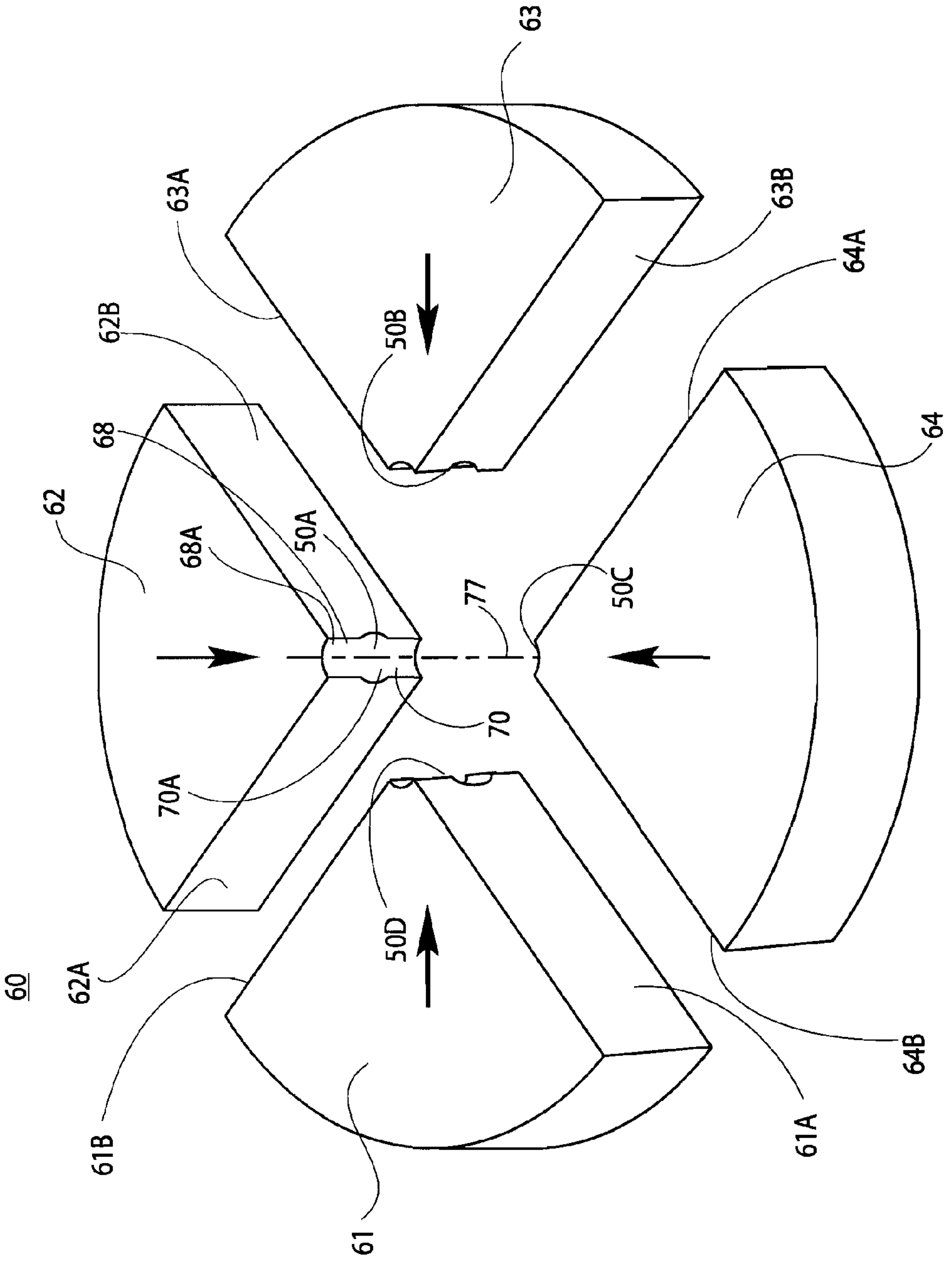
Figure 11:
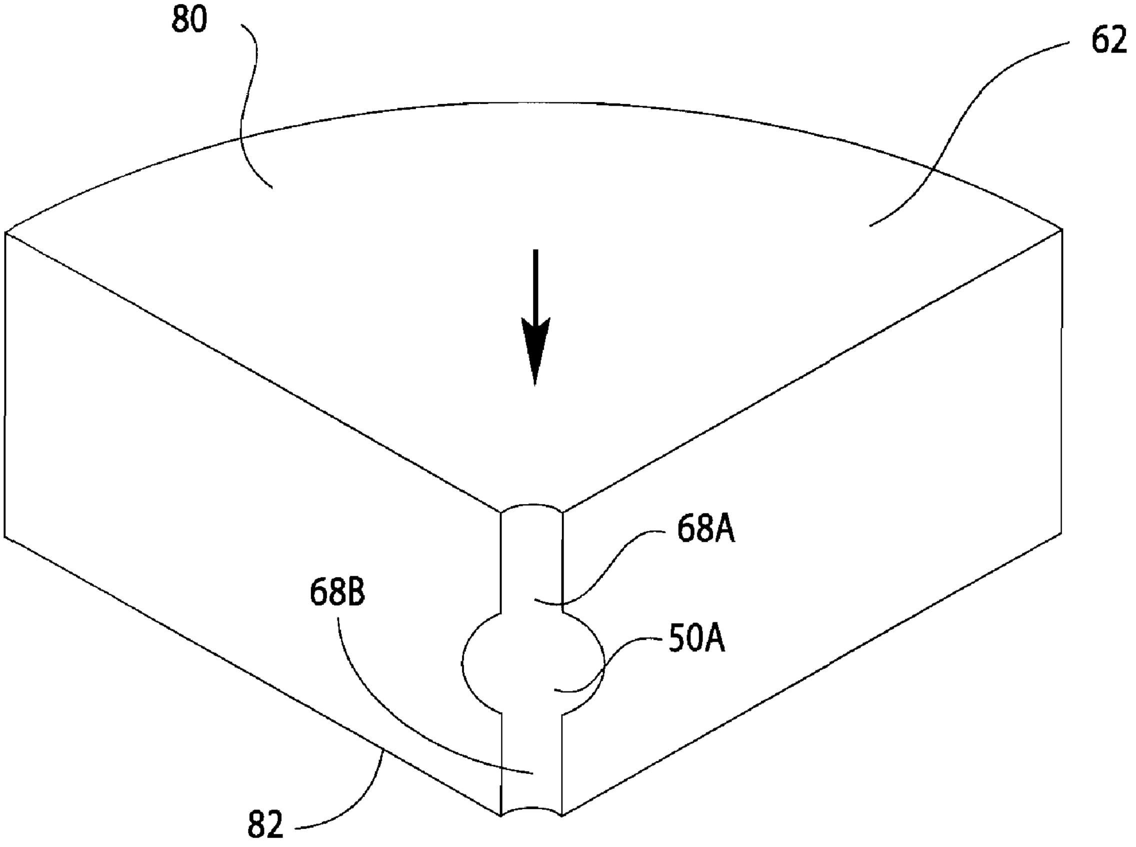
FIG. 11 illustrates the detail of a single die part from the die of FIGS. 9 and 10.

What has so far been described is the method of compressing powder 85, such as metallurgical powder, to provide a compressed green part 10. However, the manner by which the die parts 61, 62 (FIG. 6) are compressed and assembled will now be illustrated. FIGS. 9-11 illustrate a circular die 60 made up of a first die part 61, second die part 62, third die part 63 and fourth die part 64. For purposes of this discussion, each die part is identical and is comprised of a 90 degree portion of the cylindrical die 60. However, as will be discussed, one or more die parts may also be different to accommodate the desired shape of a part. A top ram (not shown) and a bottom ram (not shown) travel within the die cavity 65 along the pressing axis 77. The die 60 has a top outer surface 80 and a bottom outer surface 82 and the die cavity 65 extending therethrough along the pressing axis 77. The cavity 65 is made up of a die chamber 50 having walls with edges 52, 54 defining the shape of a green part 10 in the compressed state. The die cavity 65 also has a first pressing bore 68 extending from one edge 52 of the die chamber 50 to the upper outer surface 80 and a second pressing bore 70 extending from one edge 44 of the die chamber 50 through the lower outer surface 82. Directing attention to FIG. 10, each of the die parts 61, 62, 63, 64 has a pair of parting surfaces 61A, 61B, 62A, 62B, 63A, 63B, 64A, 64B. The parting surfaces of adjacent die parts abut against one another to form the assembled cylindrical die 60, illustrated in FIG. 9. It should be noted that the parting surfaces are not perpendicular to the pressing axis 77 so that the die parts 61, 62, 63, 64 may move apart in a direction other than parallel to the pressing axis 77, thereby avoiding damage to the green part 10 when the shape of the green part 10 is such that the die parts 61, 62, 63, 64 could not be released with motion along the pressing axis 77. As a result, the die parts 61, 62, 63, 64 must move in a direction non-perpendicular to the pressing axis 77 to release the green part 10. Such a motion provides great flexibility in pressing a desired shape into a green part 10 and releasing the green part 10 from the die without sliding the die against the green part 10 or damaging any overhanging or under hanging projection on the green part 10 that would result if the green part 10 was ejected along the pressing axis 77.

Each die part 61, 62, 63, 64 has a die chamber portion with opposing pressing bore portions. As an example, directing attention to die portion 62, which is representative of the other die portions 61, 63, 64, a die chamber portion 50A is surrounded by a first pressing bore portion 68A and a second pressing bore portion 70A. The chamber portions 50A, 50B, 50C, 50D together define the die chamber 50.

Although, for illustrative purposes, FIGS. 9-11 have illustrated four die parts 61, 62, 63, 64 essentially identical in shape with identical cavity portions 50A, it should be appreciated that, depending upon the desired configuration of the green part 10, there may be two or more die parts and the pressing bore portions and the cavity parts of each die portion may be substantially different to accommodate not only the shape of the green part 10 but, furthermore, to provide for the most efficient manner of loading the die cavity with powder and, furthermore, for releasing the green part 10 from the die.

FIGS. 9-11 have been presented to show the operation of the die parts 61, 62, 63, 64 and it should be appreciated that the cavity 50, the first pressing bore 68 and the second pressing bore 70 have been drawn in schematic only to illustrate their operation. The shape of the die cavity 50, the first pressing bore 68 and second pressing bore 70 may be any number of different geometries intended to accommodate the shape of the green part 10 intended to be produced. Also, while the die parts 61, 62, 63, 64 have been illustrated as four identical pieces of a cylinder, depending upon the desired shape of the green part 10, there may be as few as two die parts and each die part may have a completely different configuration limited only by the fact that the die parts must be able to move apart freely to release the compressed green part 10.

Although the die parts 61, 62, 63, 64 fit together closely, as a result of manufacturing tolerances, when the green part 10 is compressed, there will be parting line marks imparted to the external surface of the green part 10. FIGS. 5-8 show such a parting line mark 30. While this mark 30 is shown as straight, the contour of this mark 30 is dependent upon the mating pattern of the die parts. Additionally, depending upon the manufacturing tolerances, the parting line mark may not be easily visible with the naked eye. Additionally, the parting line mark 30 extends around the entire green part 10. However, when the parting line mark 30 is located along a corner or an edge of the green part 10, it may be difficult to discern.

Figure 12:
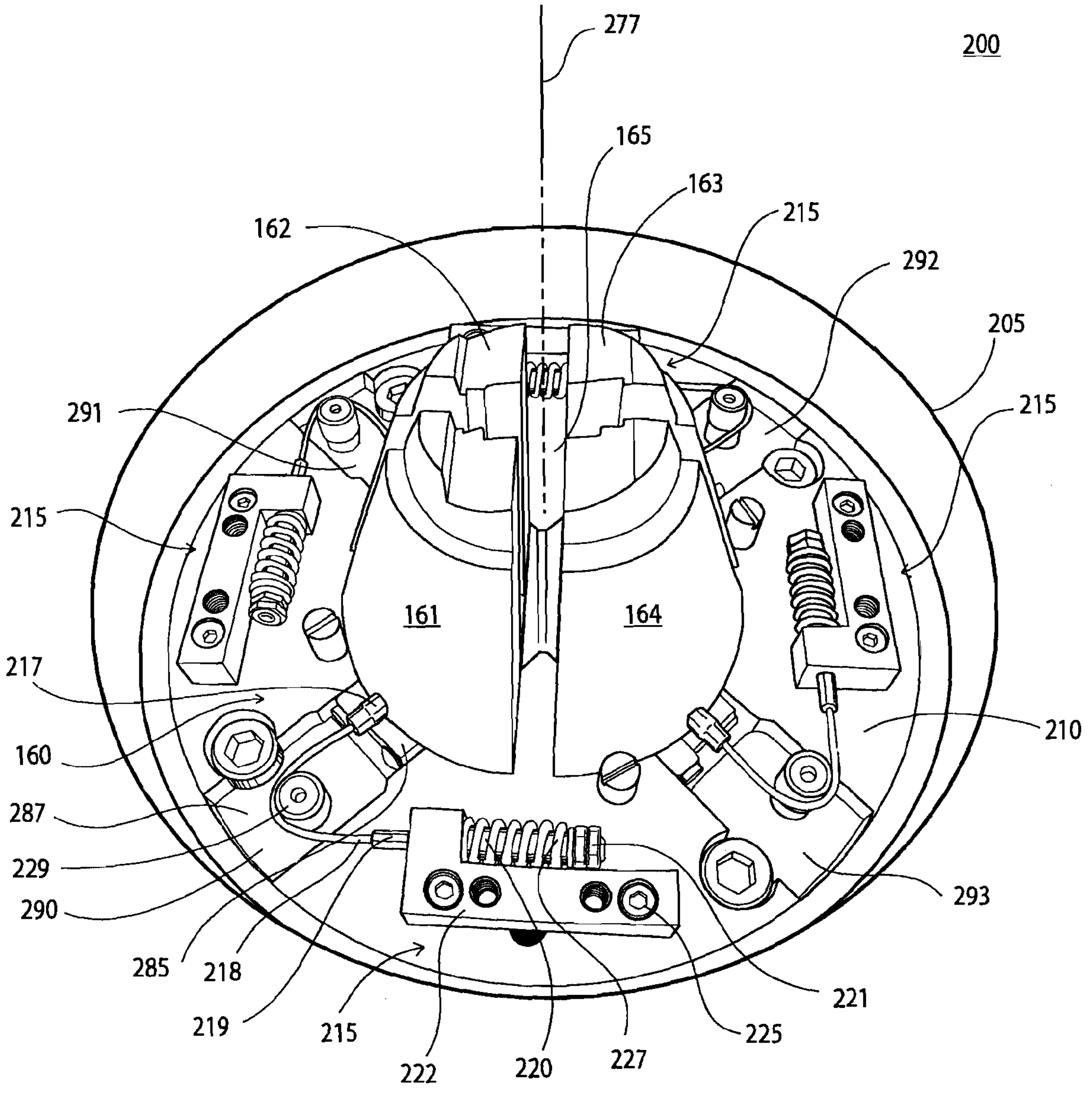
FIG. 12 illustrates a perspective view of a base plate upon which die parts of a different die are mounted, wherein the die parts are in the open position.
Figure 13:
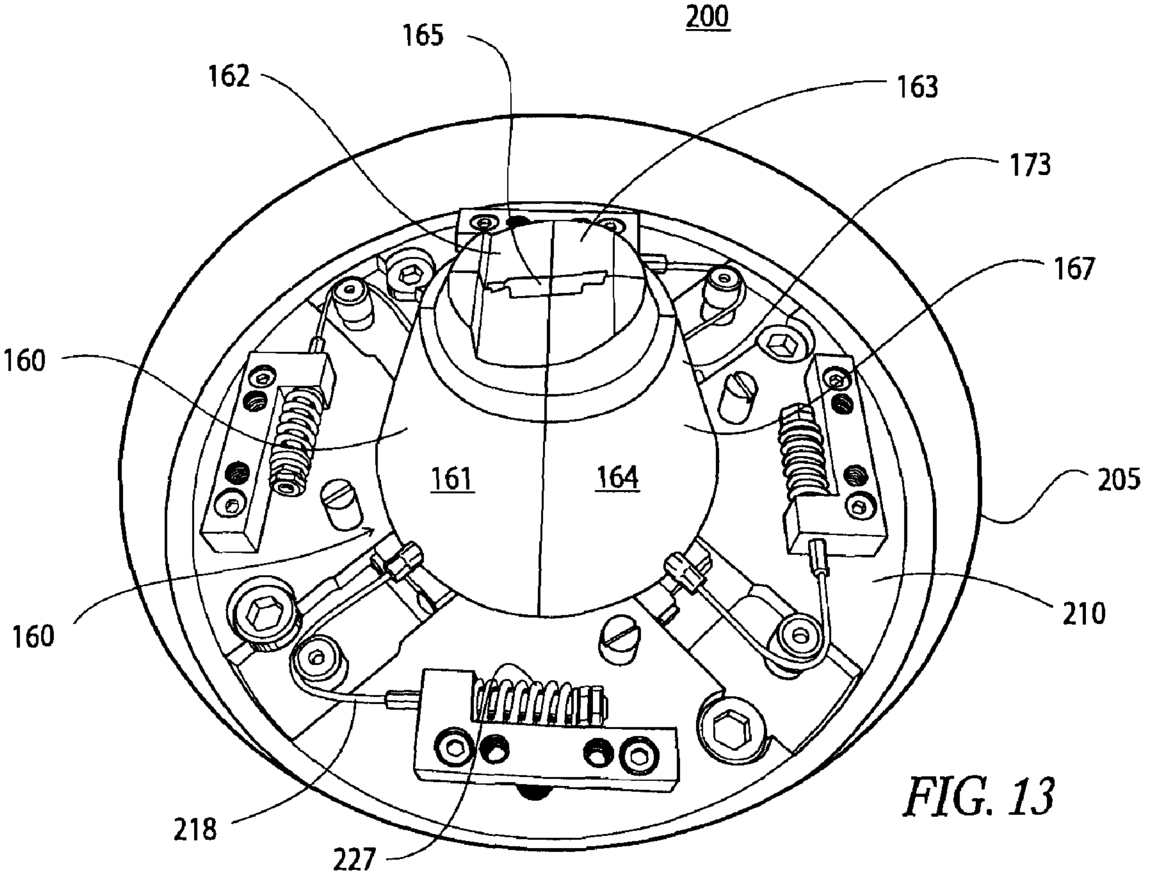
FIG. 13 illustrates the perspective view similar to that illustrated in FIG. 12, but with the die parts in the closed position.

So far, schematics have been used to describe the subject invention. FIGS. 12-14 illustrate actual hardware used to achieve one embodiment of the method and apparatus. For purposes of distinction, similar parts of the apparatus will be incremented by 100 from the reference numbers used to discuss the previous figures FIGS. 12-14 illustrate a uni-axial press 200 without the top and bottom rams illustrated. The uni-axial press 200 is used for forming a green part (not shown) from compressed powder. The press 200 is comprised of a base 205 having a floor 210 used to support a die 160 made up of die parts 161, 162, 163, 164, which are shown in their separated state in FIG. 12 and shown in their assembled state in FIG. 13. The method for producing a green part 10 is the same as that method previously discussed using the schematic figures, however, as can be seen in FIGS. 12 and 13, the die cavity 165 has a substantially different shape for the purposes of producing a differently shaped part.

Nevertheless, the die parts 161, 162, 163, 164 are secured to the base 205 but are also permitted to slide upon the base 205 between the separated state (FIG. 12) and the assembled state (FIG. 13).

Directing attention to FIG. 12, the die parts 161, 162, 163, 164 are biased to the separated position. In particular, each die part 161, 162, 163, 164 has associated with it a spring mechanism 215 and, for purposes of discussion, the spring mechanism 215 associated with die part 161 will be discussed with the understanding that this spring mechanism and its operation is identical for the remaining die parts 162, 163, 164.

The first end 217 of a cable 218 is attached to the die part 161, while a second end 219 of the cable 218 is connected to a tensioning bolt 220 slideably secured within a bracket 222. The bracket 222 is firmly secured to the base 205 using fasteners 225, such as bolts. The bolt 220 is biased by a compression spring 227 to maintain the cable 218 in tension. In particular, the bolt 220 has a bolt head 221 that is engaged by the compression spring 227, whereby, as seen in FIG. 12, the bolt 220 is urged to the right. The cable 218 extends radially from the die part 161 and wraps around a pivot pin 229. The second end 219 of the cable 218 is attached to the tensioning bolt 220. The spring mechanism 215 associated with each die part 161, 162, 163, 164 acts to bias each die part to the separated position. While the spring mechanism 215 has been discussed as one embodiment for separating the die parts, other mechanisms, such as hydraulic cylinders, may also be used.

FIG. 13 illustrates the die parts 161, 162, 163, 164 in the assembled position clearly defining the die cavity 165 and compressing the compression spring 227 by pulling the cable 218 with the die part 161 into the assembled position. As clearly illustrated in FIG. 13, the profile of the side surface 167 of the die 160 is conical, such that the side surface 167 of the die parts 161, 162, 163, 164 in the assembled state form a die cone 173.

Figure 14A:
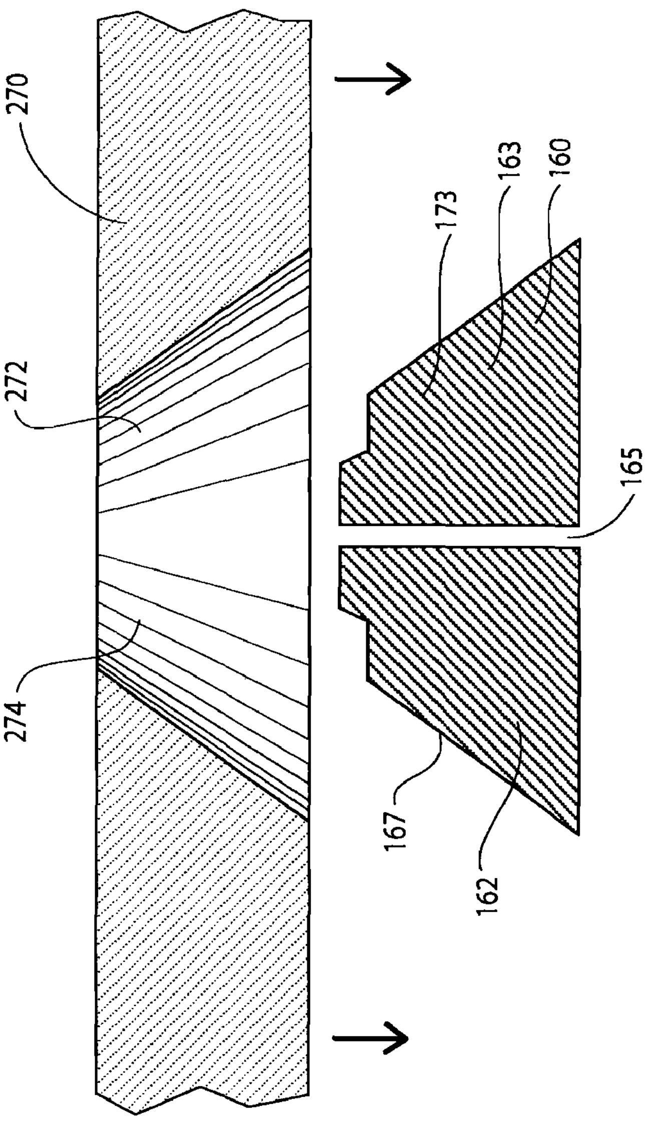
FIGS. 14A and 14B illustrate a schematic section view of the die in FIGS. 12 and 13 in the separated position and in the assembled position.
Figure 14B:
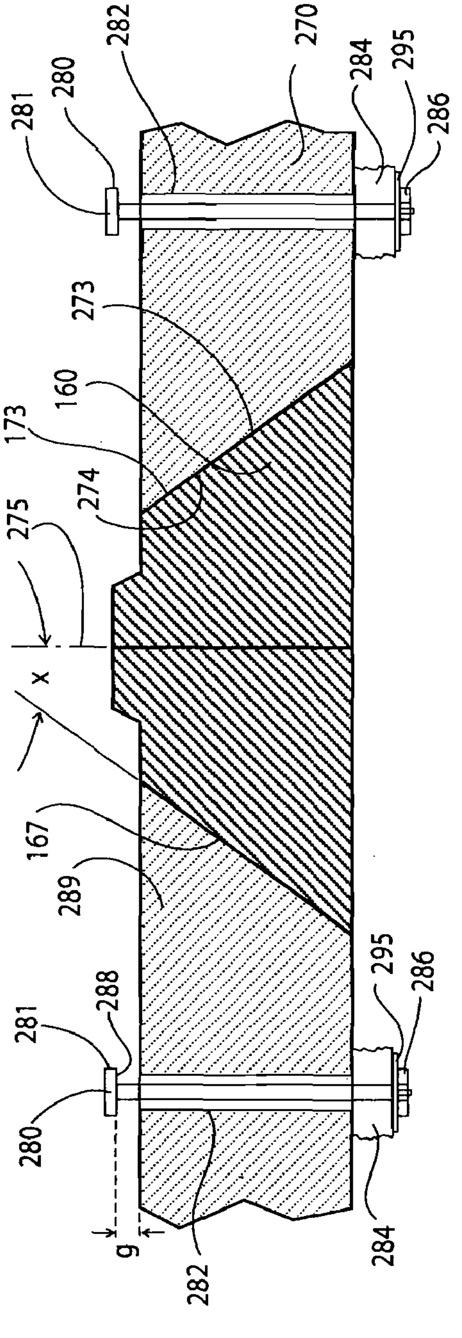

FIG. 14A illustrates the die 160 with the conical side surfaces 167 and, furthermore, illustrates a retainer 270 having an interior surface 272 with a recessed cone 274, wherein the recessed cone 274 has a shape corresponding to the die cone 173 such that the retainer 270 captures the conical die parts 161, 162, 163, 164 and secures them together in the assembled state, as illustrated in FIG. 14B, and as illustrated without the retainer 270 in FIG. 13.

FIG. 14B illustrates a cone angle X between the centerline 275 of the die 160 and the side surfaces 167 of the die cone 173 and between the centerline 275 of the die 160 and the interior surface 272 of the recessed cone 274 of the retainer 270. The cone angle X between each of the die cone 273 and the recessed cone 274 may form a Morse taper, which is a low angle taper which results in a self-sticking friction connection between the die cone 173 and the recessed cone 274. A taper of approximately 5/8 inch/foot is considered to be a Morse taper. The cone angle X, for each of the die cone 173 and the recessed cone 274, may be between 10 and 20 degrees.

In order to move the retainer 270 down over the die 160 to position the die 160 from the separated state to the assembled state, the recessed cone 274 is placed over the die cone 173, such that the interior surface 272 of the recessed cone 274 urges the side surfaces 167 of the die cone 173 radially inwardly. To achieve this, it is necessary for the retainer 270 to be moved against the die cone 173 with a force sufficient to overcome the bias of the spring mechanism 215 (FIG. 12) associated with each of the die parts 161, 162, 163, 164. A drive mechanism (not shown) displaces the retainer 270 to position the die parts 161, 162, 163, 164 from the separated position to the assembled position. The drive mechanism may be one or more hydraulic cylinders (not shown).

FIG. 14A shows the retainer 270 spaced a significant vertical distance from the die 160. In actuality, however, the separation of the die parts 161, 162, 163, 164 need only be a sufficient amount to permit the green part (not shown) to be released from the die cavity 165. Any greater separation is unnecessary and may be undesirable. Therefore, in order to control the degree of separation of the die parts 161, 162, 163, 164, the vertical motion of the retainer 270 is closely controlled. In particular, and with respect to FIG. 14B, restrictor bolts 280 extend through bores 282 and through the retainer 270. The restrictor bolts 280 extend into a foundation plate 284 which may be the base 205 (FIG. 13). Nuts 286 may be secured to the ends of the restrictor bolts 282 to restrict the bolt motion relative to the foundation plate 284. However, the restrictor bolts 280 are elongated and have a bolt head 281 slightly spaced from the top surface 289 of the retainer 270. As a result, as the retainer 270 is moved upwardly, the spring biased die parts 161, 162, 163, 164 (FIG. 13) are urged radially outwardly, but only the amount permitted by the vertical motion of the retainer 270, which itself is limited by the gap g between the top surface 289 of the retainer 270 and the bottom surface 288 of each bolt head 281. Spacers 295 may be placed between the nuts 286 and the foundation plate 284 to limit the degree to which the retainer 270 may move and, as a result, to limit the degree to which the die parts 161, 162, 163, 164 may move laterally to a separated state.

When the die parts 161, 162, 163, 164 are assembled to form the die chamber 150, the die parts will mate and form parting lines on the wall of the die chamber 150. These parting lines produce a groove in the die chamber 150. The groove produced by these parting lines will be imparted to the green part as parting line marks and, depending upon the precision with which the die parts 161, 162, 163, 164 mate in the region of the die chamber 150, these parting line marks will be more prominent or less prominent. However, they will always exist to some degree.

The green part 10 illustrated in FIG. 1 may be fabricated utilizing the uni-axial press 200 with the die cavity 165 illustrated in FIGS. 12 and 13. As seen in FIGS. 12 and 13, the die parts 161, 162, 163, 164 move back and forth from the separated position to the assembled position along a radial path, for example, path 287 associated with die part 161 illustrated in FIG. 12. Die part 161, just as the remaining die parts 162, 163, 164, moves within the radial path 287 (FIG. 12) along a bearing 285 defined by a guide slot 290 (FIG. 12) extending within the base 205 of the uni-axial press 200. As illustrated in FIG. 12, the guide slot 290 is oriented radial to pressing axis 277 through the base 205, just as the remaining guide slots 291, 292, 293 are radial to the pressing axis 277 to guide die parts 162, 163, 164, respectively.

It should be noted that the base 205 is a stand-alone part having guide pins 294A, 294B, 294C, 294D that fit within predefined bores within the uni-axial press 200. The base 205 is interchangeable with other bases that may contain other dies so that the same uni-axial press 200, depending upon the base mounted upon that uni-axial press 200, may be used to fabricate different parts for a variety of different cutting tools.

Figure 15:
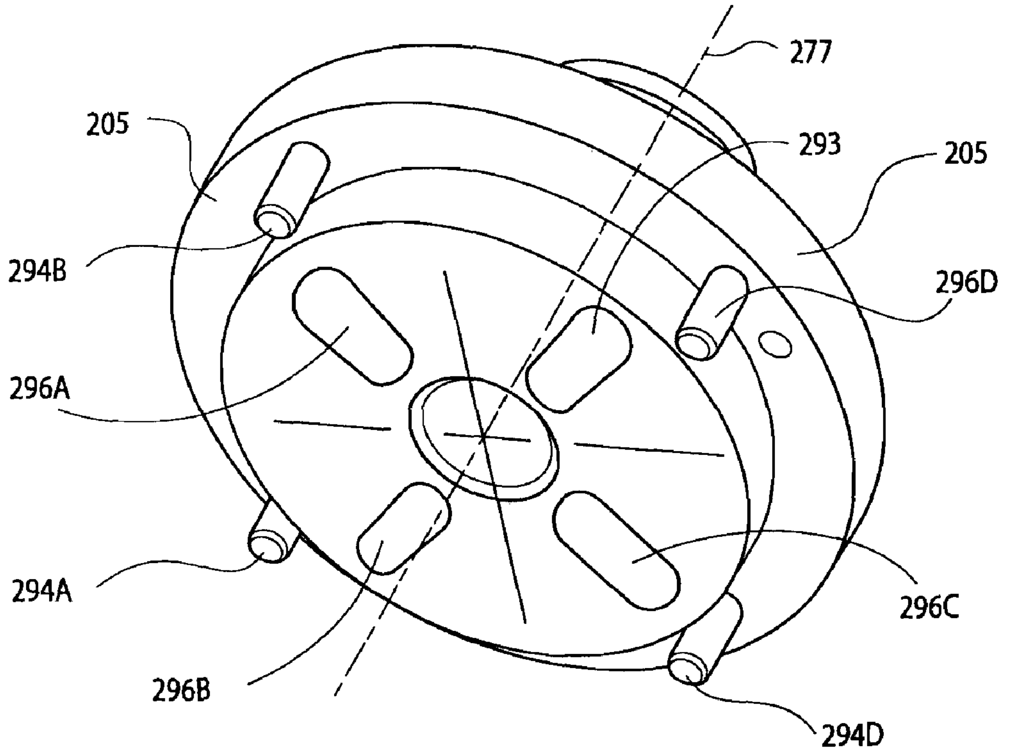
FIG. 15 illustrates a perspective view of the underside of a base plate.

FIG. 15 illustrates the bottom of the base 205 with evacuation slots 296A, 296B, 296C, 296D through which residual powder may fall to keep the base 205, the spring mechanism

215, the bearings 285 and the external surfaces of the die parts 161, 162, 163, 164 free of excess powder that may detract from the proper opening and closing of the die parts 161, 162, 163, 164.

A primary goal in the design of the path a particular die part follows from the assembled state to the separated state, is to separate the die part from the green part after compression in a manner that does not disturb the green part. In particular, using the split case die in accordance with the subject invention, a multitude of shapes may be imparted to a part, even shapes with undercuts and an appropriate die part configuration for that die part may be established to eliminate interference between the die part and the part during separation. A term of art used to describe this interference is backdraft.

Figure 16C:
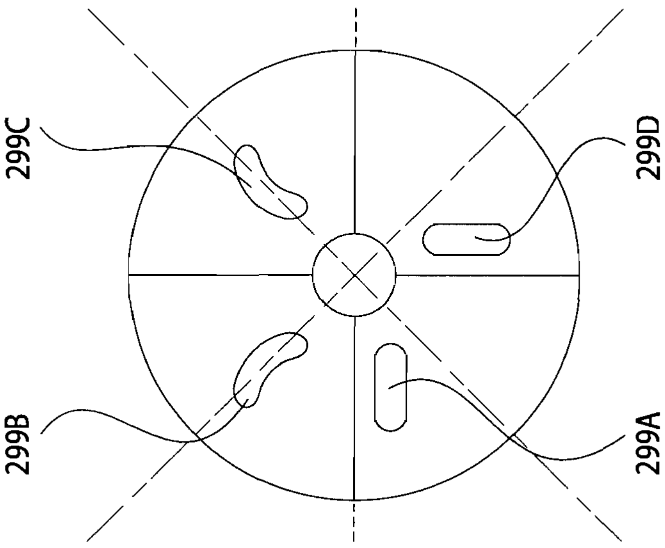
FIGS. 16A, 16B and 16C illustrate a schematic of the top view of the base plate showing different paths the die parts may travel.
Figure 16B:
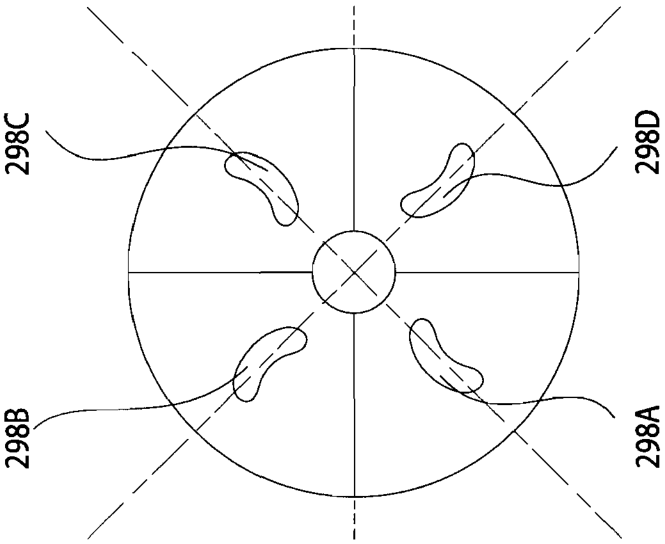
Figure 16A:
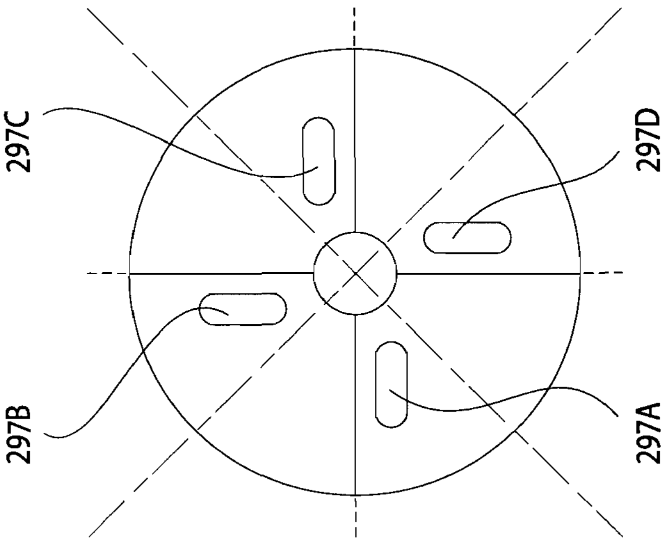

FIGS. 16A, 16B, 16C illustrate different paths that a die part might follow when being separated from a part to avoid backdraft. In particular, with respect to FIG. 16A, guide slots 297A, 297B, 297C, 297D are positioned to define an offset radial straight path. These configurations would be imparted to the guide slots 290, 291, 292, 293, illustrated in FIG. 15, for a particular base.

Directing attention to FIG. 16B, guide slots 298A, 298B, 298C, 298D illustrate a non-linear curved path that the die parts might follow to release a green part. Finally, directing attention to FIG. 16C, it is not necessary for the path of one guide slot, such as 299A, to resemble that path for another guide slot, such as 299B. FIG. 16C illustrates the variety of different paths with guide slots 299A, 299B, 299C, 299D that may be selected to release a die portion from a green part without imparting backdraft to the green part.

The split case die in accordance with the subject invention comprises die parts which move in a direction different than that from the pressing axis and, by doing so, allows a part to be shaped into geometries not previously available through a pressing operation. In the past, injection molding techniques were utilized or pressing techniques were utilized where, after the initial pressing operation, the part required extensive grinding to arrive at the final shape. Through the split case die used with the uni-axial press described herein, part shapes not previously available by a pressing operation, may now be produced.

What has so far been described is the hardware associated with the fabrication of the green part 10 illustrated in FIGS. 1 and 2, utilizing the split case die uni-axial press in accordance with the subject invention.

Figure 17:
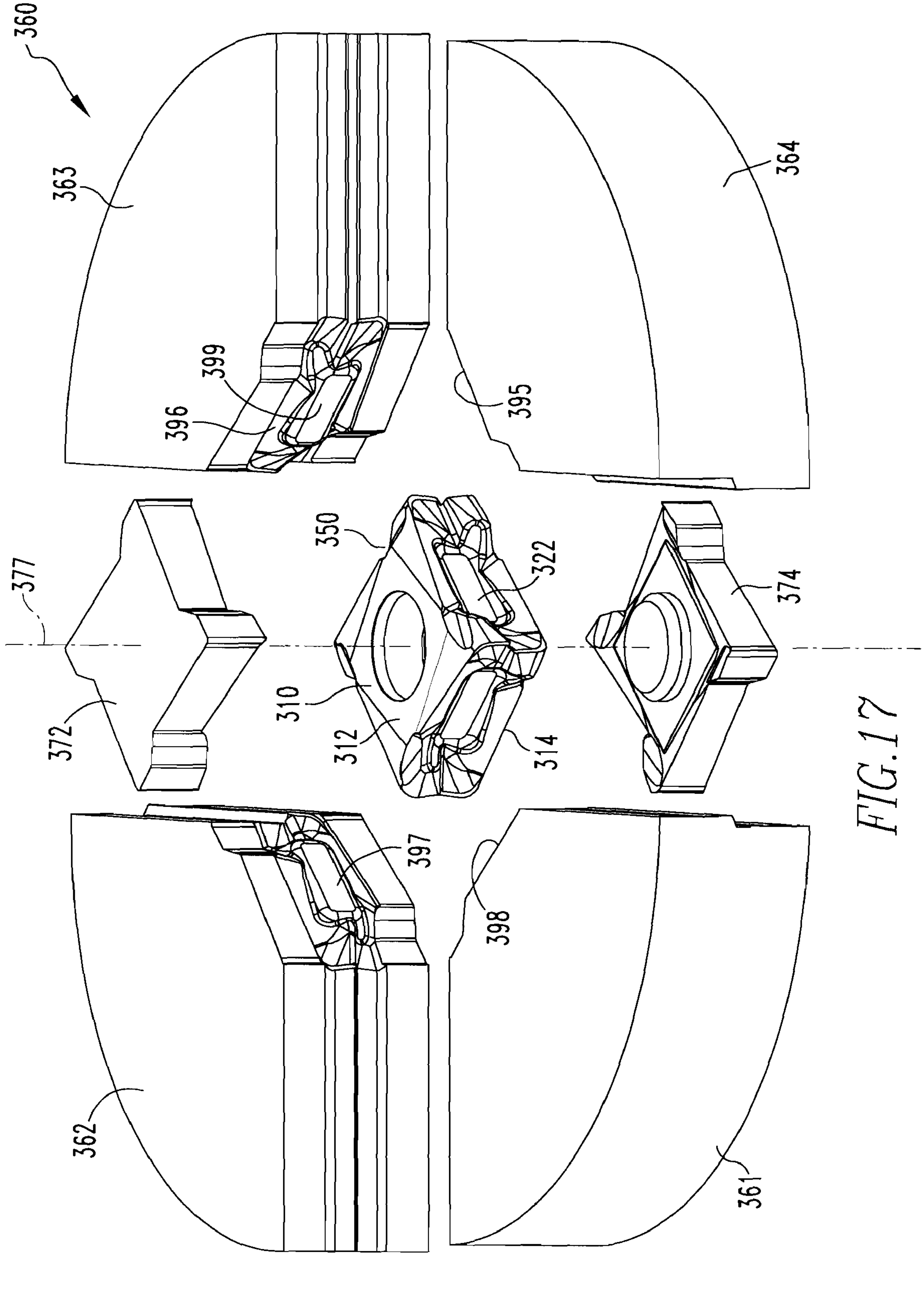
FIG. 17 illustrates die parts in a separated state subsequent to fabricating a complex part.
Figure 18:
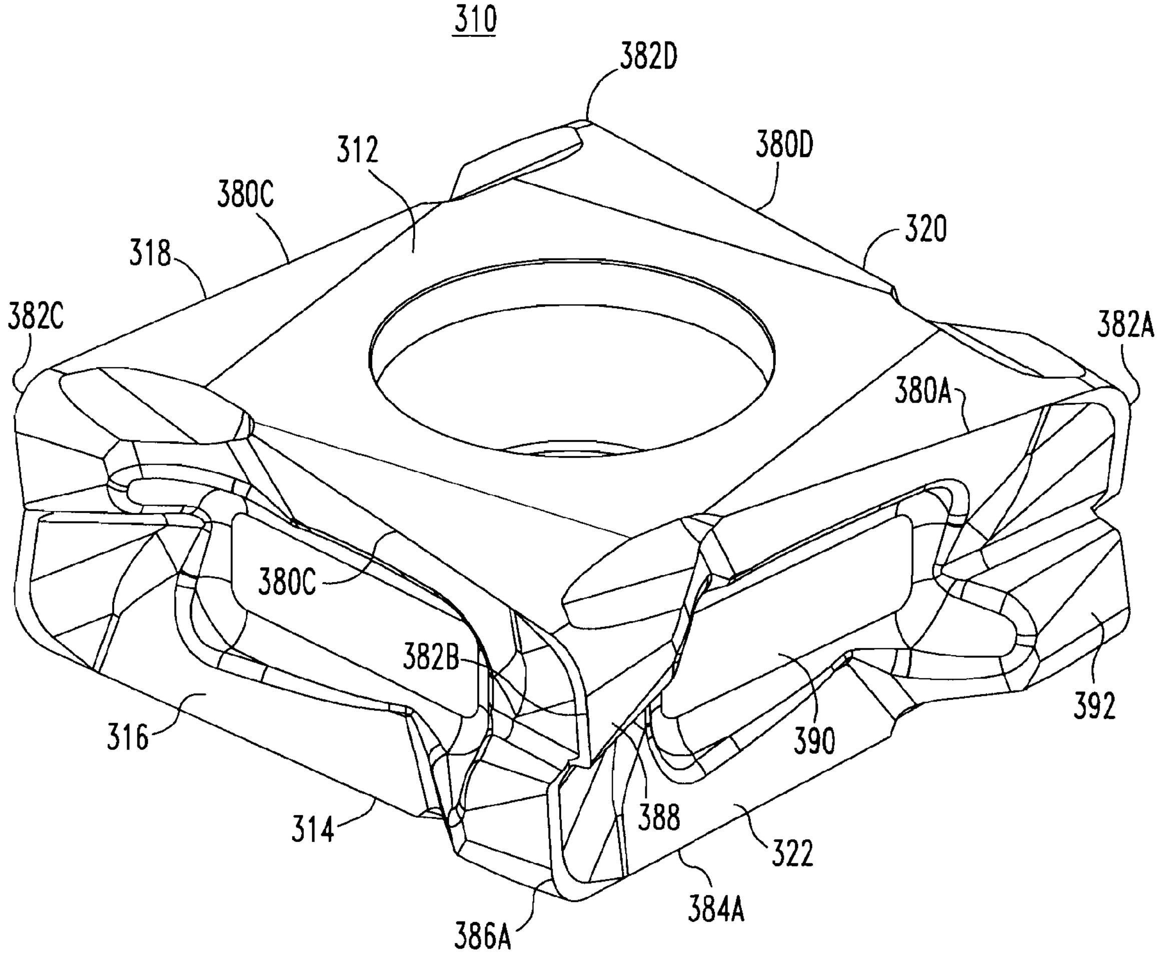
FIG. 18 is an enlarged view of the part shown in FIG. 18.

It is possible with such a split case die to fabricate green parts having complex surfaces on any side. Directing attention to FIGS. 17 and 18, a die 360 is comprised of die parts 361, 362, 363, 364, which in the instance illustrated in FIGS. 17 and 18, are moveable in a direction radial to the pressing axis 377. A top ram 372 represented only by the end of the top ram and a bottom ram 374 move relative to one another along the pressing axis 377. In the assembled state (FIG. 20), the die parts 361, 362, 363, 364, the top ram 372 and the bottom ram 374 define the die chamber 350 which has a shape identical to the green part 310 formed during the pressing operation. Green part 310, better illustrated in FIG. 18, is made up of a top surface 312, a bottom surface 314 and side walls 316, 318, 320, 322 therebetween. A typical side wall 322 is comprised of a pair of primary cutting edges 380A, 384A and secondary cutting edges 382A, 386A adjacent thereto. For this particular green part 310, each side has such a cutting edge arrangement and, as a result, the primary cutting edge 380B and secondary cutting edge 382B, associated with sidewall 316, provide a projection 388 extending from a recessed plateau or seating pad 390, which is the innermost portion of side wall 322. Diametrically opposed to projection 388 is another projection 392 associated with cutting edges on the opposite side of the green part 310. This combination of recessed surfaces and projections provides a geometry that is ideally suited for the split case die uni-axial press in accordance with the subject invention. In particular, returning to FIG. 17 and directing attention to die part 364, the face 395 of the die part 364 has a contour essentially identical to the contour of the side wall 322. For purposes of explaining, the die face 396 associated with die part 363, will be utilized with the understanding that these two faces 395, 396 are identical.

Figure 19:
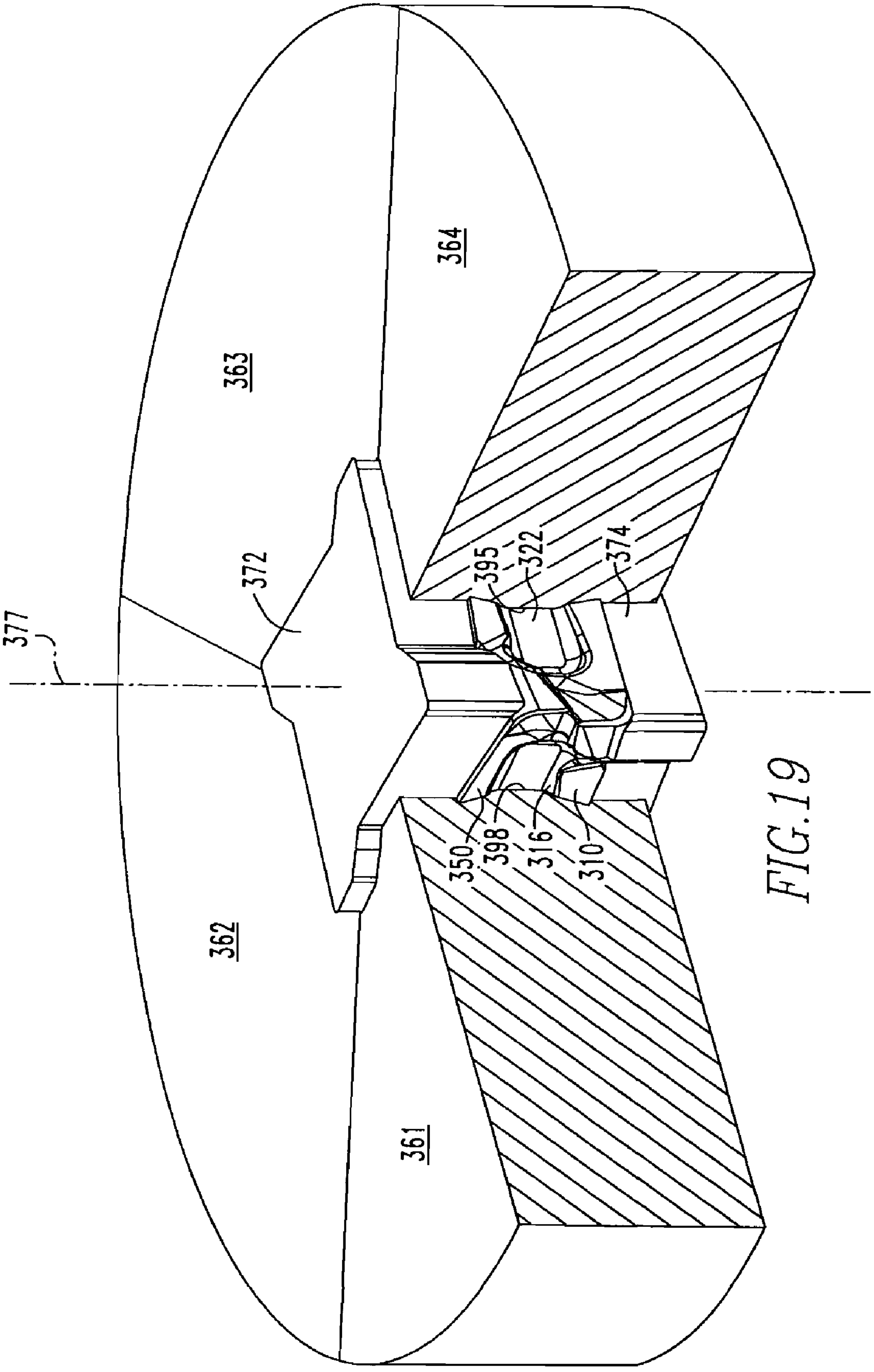
FIG. 19 illustrates the die parts in the assembled position to fabricate the complex part shown in FIGS. 17 and 18.

For purposes of explanation, die face 396 (FIG. 17) will be discussed in conjunction with side wall 322 (FIG. 18) of the green part 310. For at least green part 310, all four sides are identical and the view of side 322 is more revealing than the view of side 320. The die face 396 (FIG. 17) has a seating pad projection 399 used to form the seating pad 390 (FIG. 18) and has additional surfaces that are reflected from examination of the side wall 322. FIG. 20 illustrates the green part 310 with the side walls 316, 322 within the die chamber 350 to form the green part 310. The face 395 of die part 364 and the face 398 of die part 361, define the contour of the side wall 322, 316 of the green part 310. It can be appreciated with respect to FIG. 19, that the green part 310 is immovable along pressing axis 377 within the die chamber 350 even with the top ram 372 and bottom ram 374 removed because it is captured by the die parts 361, 362, 363, 364 (FIG. 17) and may only be released by a motion of each die part 361, 362, 363, 364 that is nonparallel to the pressing axis 377. The green part 310 would not tolerate any relative motion that is entirely parallel to pressing axis 377. FIG. 17 illustrates the direction of the displacement required to release the part during this pressing operation.

Figure 20A:
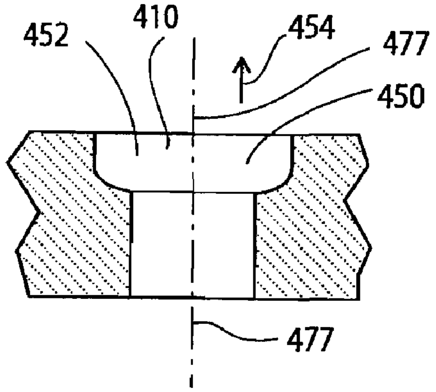
FIGS. 20A, 20B, 20C and 20D illustrate different internal die chamber shapes to determine when the use of a split case die is most beneficial.
Figure 20B:
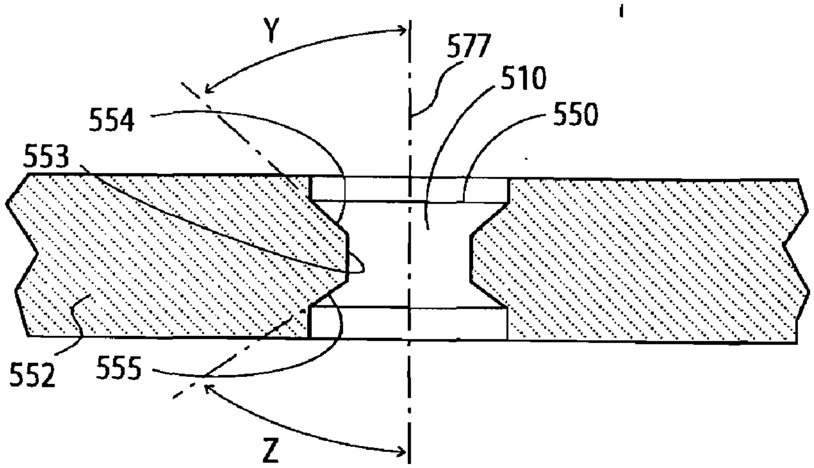

Depending upon the geometry of the die chamber, a split case die may be required to press a certain green part. Directing attention to FIG. 20A, a die chamber 450 having an open end 452 with no restrictions would not require a split case die because the green part may be urged in the direction of arrow 454 along the pressing axis 477 to eject the green part 410 from the die 460. FIG. 20B, although relatively simple, illustrates a configuration ideal for a split case die pressing operation. The wall 553 of the die chamber 550 has at least one portion 554 that forms a positive angle Y with the pressing axis 577 and at least one other portion 555 that forms a negative angle Z with the pressing axis 577. The combination of surfaces with these angles defines a green part that is captured by the die chamber 550 and cannot be safely removed from the die chamber 550 without laterally displacing the die parts of the split case die.

While the arrangement illustrated in FIG. 20B is a fairly simple configuration, the features illustrated may be applied to much more complex arrangements suitable for fabrication using a split case die pressing operation.

In FIG. 20B, the die chamber 550 includes a restriction 552 that would prevent the green part 510 from being axially displaced along the pressing axis 577 to displace the green part 510. Therefore, a die having a die chamber 550 is ideal for the split case die in accordance with the subject invention.

Figure 20C:
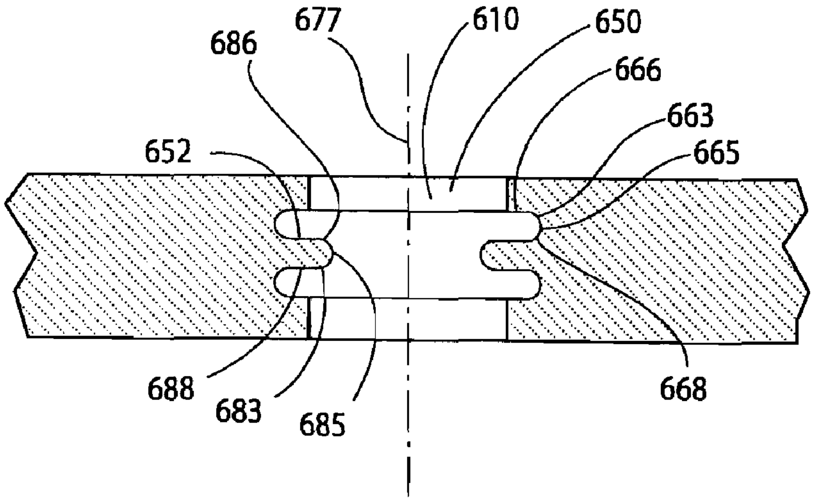

Directing attention to FIG. 20C, the die chamber 650 includes a bellows shaped wall 652 that captures the green part 610 and does not permit movement of the part along the pressing axis 677. FIG. 20C illustrates another configuration ideal for a split case die pressing operation. The wall 662 of the die chamber 650 has a concave surface 663 along a plane non-perpendicular to the pressing axis 677. At least one point 665 along the surface 663 between the ends 666, 668 of the surface 663 have a tangent parallel to the pressing axis 677.

In the alternative, the wall 662 of the die chamber 650 may have a convex surface 683 along a plane non-perpendicular to the pressing axis 677. At least one point 685 along the surface 683 between the ends 686, 688 of the surface 663 have a tangent parallel to the pressing axis 677.

Figure 20D:
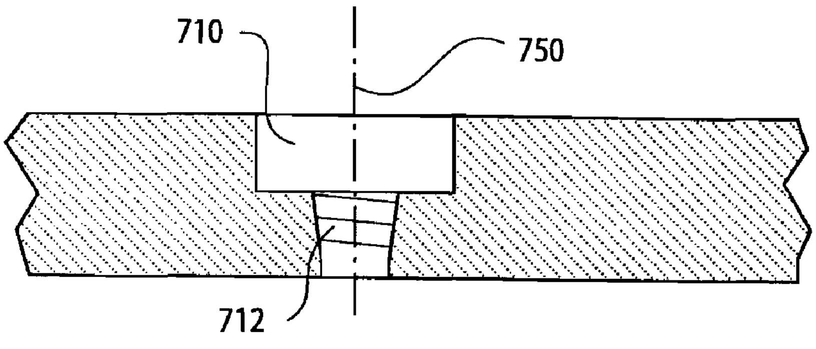

FIG. 20D illustrates yet another die chamber 750, which is capable of imparting to the green part 710 threads of a spiral flute 712. This arrangement also is ideally suited for the split case die in accordance with the subject invention.

What has so far been discussed, is the fabrication of a green part having unique surface features which are most efficiently formed utilizing a uni-axial press and a split case die as described herein.

U.S. Pat. No. 6,986,866 assigned to the Assignee of the present application, entitled "Method and Apparatus for Cross-Hole Pressing To Produce Cutting Inserts" is hereby incorporated by reference and describes a method and apparatus for imparting to a green part, a cross-hole extending through the part in a direction nonparallel to the pressing axis. However, this patent describes the use of a solid unified die for producing such a cross-hole.

In another embodiment of the subject invention, a cross-hole may be imparted to a green part in conjunction with the use of a split case die to provide not only the unique surface features available using a split case die but, furthermore, to provide a hole extending through the green part along an axis different from the pressing axis.

Figure 21C:
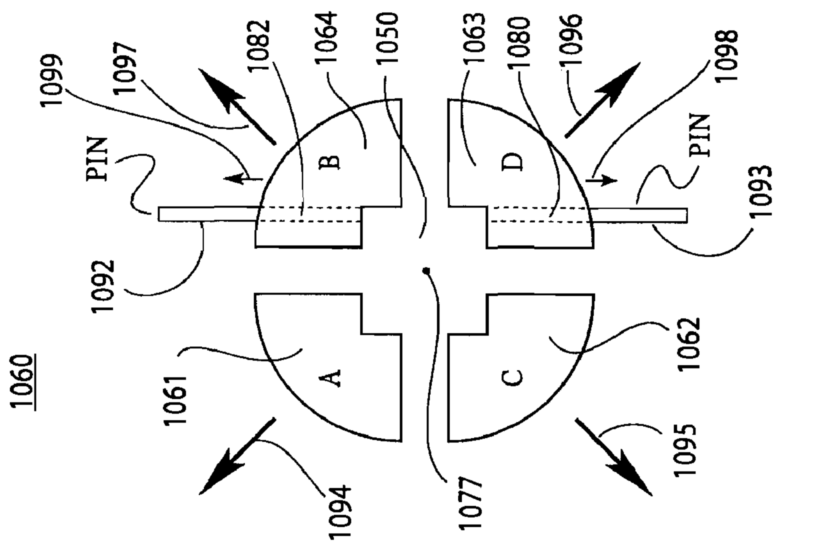
FIGS. 21A, 21B and 21C illustrate different arrangements, whereby a core pin may be used in conjunction with a split case die.
Figure 21B:
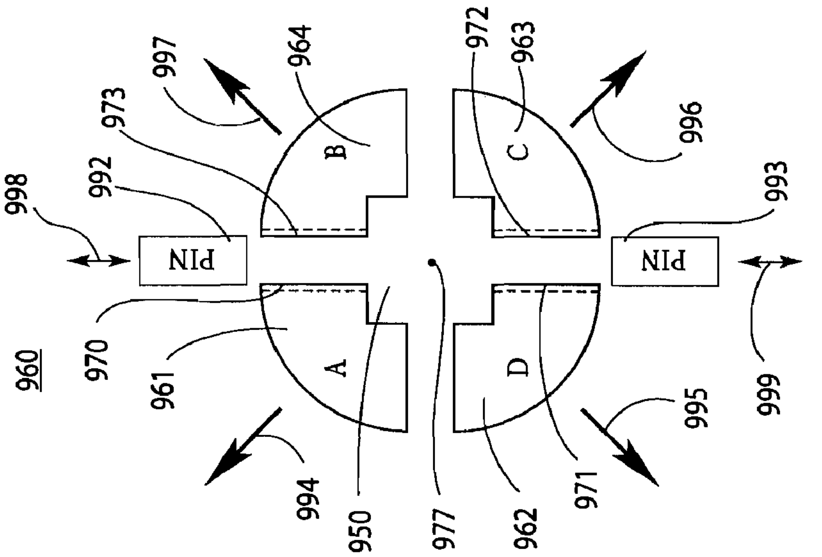
Figure 21A:
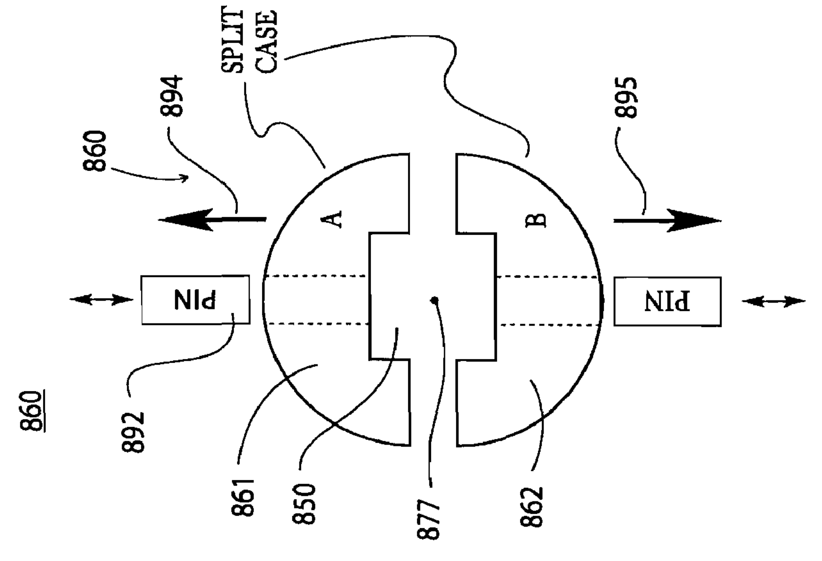

FIG. 21A illustrates a die 860 having a die part 861 and an opposing die part 862. A bore 890 extending through the die parts 861, 862 is suitable to accept a cross pin 892 within the die part 861 and a cross pin 893 within the die part 862. In the assembled state, these cross pins 892, 893 contact each other within the die chamber 850, such that when the die parts 861, 862 are assembled and the cross pins 892, 893 are contacting one another, the die cavity 860 may be filled with powder and, upon pressing, the green part (not shown) will have a bore extending therethrough in a direction nonparallel to the pressing axis 877, which as illustrated in FIG. 21A is into the page. In the arrangement illustrated in FIG. 21A, the die part 861 and the die part 862 are moveable along arrows 894, 895, which is the same direction the cross pins 892, 893 move. Note the cross pins 892, 893 are not limited to motion parallel with the die parts 861, 862.

Directing attention to FIG. 21B, die parts 961, 962, 963, 964 of die 960 are moveable in a radial direction indicated by arrows 994, 995, 996, 997 which extend radially from the pressing axis 977 which is into the page. Cross pins 992, 993 may be positioned within indentations 970, 971, 972, 973 found in die parts 970, 971, 972, 973, respectively, which would accommodate cross pins 992, 993 when the die 960 is in the assembled state. The cross pins 992, 993 contact within the die chamber 950. Thereafter, when the die chamber 950 is filled with powder and that powder is compressed to form a green part, the green part will have the cross bore imparted by the cross pins 992, 993. It should be noted that in FIG. 21B, the cross pins 992, 993 move in a direction along arrows 998 and 999, which is different than the direction of the die parts specified by arrows 994, 995, 996, 997.

Directing attention to FIG. 21C, unlike FIG. 21B, where indentations 970, 971, 972, 973 were placed within the wall of each die part 961, 962, 963, 964, die 1060 is comprised of die parts 1061, 1062, 1063, 1064 moveable along arrows 1094, 1095, 1096, 1097. However, the cross pins 1092, 1093 which move together to mate within the die chamber 1050 radial to the pressing axis 1077, which is into the page, extend through bores 1080, 1082 within die part 1063, 1064 in a direction along arrows 1098, 1099 different from the direction specified by arrows 1094, 1095, 1096, 1097. Once again, in the assembled state, the die chamber 1050 is filled with powder and compressed such that the green part has a bore extending therethrough along an axis different from the pressing axis 1077.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A die for use with a uni-axial press for forming a compressed part from powder, wherein the die has upper and lower outer surfaces and a cavity extending therethrough along a pressing axis, wherein the cavity is made up of a die chamber having walls with edges defining the shape of the part in the compressed state and a pressing bore extending from each edge of the die chamber to the upper outer surface and to the lower outer surface respectively, wherein each pressing bore at the edge of the die chamber overlaps entirely with the die chamber at the respective edge, and wherein the die is comprised of at least two separable die parts which abut with and contact one another along parting surfaces and wherein the parting surfaces along the pressing bore are non-perpendicular to the pressing axis.

2. The die according to claim 1, wherein at least two of the walls of opposing die parts, when viewed in a direction perpendicular to the pressing axis, are parallel to but not collinear with one another.

3. The die according to claim 1, wherein when viewed in a direction perpendicular to the pressing axis, the chamber walls of at least two die parts have different profiles.

4. The die according to claim 1, further comprising a removable core rod insertable within the die chambers in a direction non-parallel to the pressing axis to define a core bore through the chamber.

5. A die for use with a uni-axial press for forming a compressed part from powder, wherein the die has upper and lower outer surfaces and a cavity extending therethrough along a pressing axis, wherein the cavity is made up of a die chamber having walls with edges defining the shape of the part in the compressed state and, wherein the die is comprised of at least two separable die parts which abut with and contact one another along parting surfaces and wherein the parting surfaces along the pressing bore are non-perpendicular to the pressing axis, wherein each die part is adapted to move only in a direction other than parallel to the pressing axis and, wherein each die part has:

a) a chamber segment which together with the other chamber segment(s) define the die chamber;

b) parting surfaces along the chamber segment which, in the assembled die, contact adjacent parting surfaces along the chamber segment of the one or more other die parts to surround and define the die chamber;

c) wherein, when viewed in a direction perpendicular to the pressing axis, the chamber walls have at least one portion that forms a positive angle with the pressing axis and at least one other portion that forms a negative angle with the pressing axis; and d) wherein the die cavity further includes a first pressing bore and a second pressing bore extending along the pressing axis from opposite edges of the die chamber to the upper and lower outer surfaces, wherein each pressing bore at the edge of the die chamber overlaps entirely with the die cavity at the respective edge.

6. The die according to claim 5, wherein at least two of the parting lines of opposing die parts, when viewed along the pressing axis, segments are parallel to but not collinear with one another.

7. The die according to claim 5, wherein when viewed along the pressing axis, the chamber walls of at least two die parts have different profiles.

8. The die according to claim 5, further comprising a removable core rod insertable within the die chamber in a direction non-parallel to the pressing axis to define a core bore through the chamber.

9. A die for use with a uni-axial press for forming a compressed part from powder, wherein the die has upper and lower outer surfaces and a pressing bore extending therethrough along a pressing axis and, wherein the die is comprised of at least two separable die parts, wherein each die part has:

a) a chamber segment which together with the other chamber segment(s) define a die chamber having chamber walls;

b) a pressing bore segment which together with the other pressing bore segment(s) define the pressing bore extending from opposing ends of the chamber through the die outer surfaces;

c) parting surfaces adjacent to the chamber segment which, in the assembled die, contact parting surfaces of other chamber surface(s) to assemble the die;

d) wherein the chamber walls are spaced from the upper and lower outer surfaces and have at least one of either a concave or convex surface with respect to the pressing axis or, wherein at least one point along the walls has a curved surface within the die chamber that has a tangent parallel to the pressing axis, and e) wherein at least two of the parting surfaces of opposing die parts, when viewed along the pressing axis, are parallel with one another.

10. The die according to claim 9, wherein when viewed along the pressing axis, the chamber walls of at least two die parts have different profiles.

11. The die according to claim 9, further comprising a removable core rod insertable within the die chambers in a direction non-parallel to the pressing axis to define a core bore through the chamber.

12. The die according to claim 9, wherein at least two of the parting surfaces of opposing die parts, when viewed along the pressing axis, are parallel to but not collinear with one another.

13. A uni-axial press for forming a part from compressed powder, wherein the press is comprised of:

a) a die having at least two separable die parts that in the assembled state define a die chamber therein and a pressing bore along a pressing axis extending from opposing edges of the chamber through the die outer surface, wherein the die has chamber walls that define a volume having a shape that captures a formed part so that it is immovable within the assembled die;

b) at least one top ram and at least one bottom ram movable relative to one another along the pressing axis proximate to the edges of the chamber;

c) wherein the at least two separable die parts each have a chamber part which together define the die chamber and, wherein the die parts are movable between an assembled state and a separated state in directions that are non-parallel to the pressing axis; and d) wherein parting surfaces adjacent to the chamber part, in the assembled die, contact adjacent parting line surfaces of other chamber part(s) to surround the chamber and wherein the parting surfaces are oriented to form a non-perpendicular angle with the pressing axis.

14. The uni-axial press according to claim 13, wherein the die moves in a direction that is radial to the pressing axis.

15. The uni-axial press according to claim 13, wherein the die moves in a direction along a path offset from the pressing axis.

16. The uni-axial press according to claim 13, wherein the die moves in a direction that is linear.

17. The uni-axial press according to claim 13, wherein the die moves in a direction that is non-linear.

18. The uni-axial press according to claim 13, wherein the chamber wall has a portion that forms a positive angle with the pressing axis and another portion that forms a negative angle with the pressing axis.

19. The uni-axial press according to claim 13, wherein the chamber wall has at least one of either a concave or convex surface along a plane non-perpendicular with the pressing axis or, wherein at least one point along the surface between the ends of the surface has a tangent parallel to the pressing axis.

20. A uni-axial press for forming a part from compressed powder, wherein the press is comprised of:

a) a die having at least two separable die parts that in the assembled state define a die chamber therein and a pressing bore along a pressing axis extending from opposing ends of the chamber through the die outer surface;

b) at least one top ram and at least one bottom ram movable relative to one another along the pressing axis proximate to the ends of the chamber;

c) wherein the at least two separable die parts each have a chamber part which together define the die chamber and, wherein the die parts are movable between an assembled state and a separated state in directions that are non-parallel to the pressing axis; and d) a base separate from the die parts which supports the die parts and permits sliding motion of the die parts between the assembled and the separated states.

21. The uni-axial press according to claim 13, further comprising a removable core rod insertable to define a core bore through the chamber in a direction non-parallel to the pressing axis.

22. The uni-axial press according to claim 13, wherein the uni-axial press is a multi-platen press.

* * * * *